United States Patent [19]
Zinda, Jr.

[11] Patent Number: 5,806,055
[45] Date of Patent: Sep. 8, 1998

[54] SOLID STATE BALLAST SYSTEM FOR METAL HALIDE LIGHTING USING FUZZY LOGIC CONTROL

[76] Inventor: Kenneth L. Zinda, Jr., 2588 Princeton Rd., Cleveland Heights, Ohio 44118

[21] Appl. No.: 770,136

[22] Filed: Dec. 19, 1996

[51] Int. Cl.[6] ............................. G06F 15/18; H05B 41/00
[52] U.S. Cl. ................. 706/45; 315/209 R; 315/200 R; 315/360
[58] Field of Search ..................... 315/360, 362, 315/308, 304, 209 R, 291, 247, DIG. 7, 200 R; 706/45, 4

[56] References Cited

U.S. PATENT DOCUMENTS

| | | | |
|---|---|---|---|
| Re. 33,057 | 9/1989 | Clegg et al. ............................. | 315/224 |
| 4,037,148 | 7/1977 | Owens et al. ........................... | 323/263 |
| 4,156,166 | 5/1979 | Shapiro et al. ...................... | 315/209 R |
| 4,188,660 | 2/1980 | Knoll ....................................... | 363/49 |
| 4,188,661 | 2/1980 | Bower et al. .............................. | 363/49 |
| 4,196,544 | 4/1980 | Davis et al. ................................. | 47/17 |
| 4,199,710 | 4/1980 | Knoll ..................................... | 315/205 |
| 4,204,141 | 5/1980 | Nuver ..................................... | 315/311 |
| 4,275,445 | 6/1981 | Di Pietro Elizaran .................. | 364/480 |
| 4,287,468 | 9/1981 | Sherman ................................. | 323/322 |
| 4,289,993 | 9/1981 | Harper et al. ........................... | 315/311 |
| 4,358,717 | 11/1982 | Elliott ..................................... | 315/308 |
| 4,396,872 | 8/1983 | Nutter ..................................... | 315/308 |
| 4,409,522 | 10/1983 | Elliott ..................................... | 315/308 |
| 4,438,369 | 3/1984 | Hicks et al. .............................. | 315/49 |
| 4,506,195 | 3/1985 | Elms ....................................... | 315/205 |
| 4,508,996 | 4/1985 | Clegg et al. ............................. | 315/224 |
| 4,641,061 | 2/1987 | Munson ................................... | 315/210 |
| 4,684,850 | 8/1987 | Stevens ............................... | 315/209 R |
| 4,749,913 | 6/1988 | Stuermer et al. ....................... | 315/175 |
| 4,751,398 | 6/1988 | Ertz, III .................................... | 307/66 |
| 4,873,616 | 10/1989 | Frederick et al. ......................... | 363/17 |
| 4,873,617 | 10/1989 | Frederick et al. ......................... | 363/17 |
| 4,873,618 | 10/1989 | Frederick et al. ......................... | 363/17 |

(List continued on next page.)

*Primary Examiner*—Allen R. MacDonald
*Assistant Examiner*—Sanjiv Shah
*Attorney, Agent, or Firm*—Benesch, Friedlander, Coplan & Aronoff LLP

[57] ABSTRACT

An apparatus (20) to control a high intensity discharge lamp (24) by generating fuzzy logic transfer functions (360, 362) with a software package (368). The fuzzy logic transfer functions (360, 362) are applied by a controller (210) for controlling the operation of the lamp (24). The first fuzzy logic transfer function (360) includes both of a lamp ignition membership function and a lamp steady state membership function. The second fuzzy logic transfer function (362) includes a first current error magnitude membership function and a second different current error magnitude membership function. Both of the first and second membership functions functionally related to both of the error current value and a PWM count change value. A current sense resistor (256) provides a signal indicative of lamp current to the controller (210). An internal real time clock (RTC) in the controller (210) measures the amount of time that the lamp (24) is operating and provides a real time signal for use in the controller (210). The controller (210) applies the first and second fuzzy logic transfer functions (360, 362) to control the operation of the lamp (24). The controller (210) provides a control signal on the output (230) in response to both of the signal from the current sense resistor (256) and the signal from the internal timer (RTC) in accordance with both the first and the second fuzzy logic transfer functions (360, 362).

28 Claims, 12 Drawing Sheets

U.S. PATENT DOCUMENTS

| | | | |
|---|---|---|---|
| 4,935,672 | 6/1990 | Lammers et al. | 315/200 R |
| 4,952,844 | 8/1990 | Godyak et al. | 315/205 |
| 5,036,256 | 7/1991 | Garrison et al. | 315/308 |
| 5,047,695 | 9/1991 | Allen et al. | 315/291 |
| 5,051,665 | 9/1991 | Garrison et al. | 315/287 |
| 5,103,139 | 4/1992 | Nilssen | 315/219 |
| 5,222,191 | 6/1993 | Enomoto | 395/3 |
| 5,225,742 | 7/1993 | Beasley | 315/307 |
| 5,315,214 | 5/1994 | Lesea | 310/339 |
| 5,319,284 | 6/1994 | Lee | 315/209 R |
| 5,365,151 | 11/1994 | Spiegel et al. | 315/209 R |
| 5,378,964 | 1/1995 | Kang | 315/247 |
| 5,381,076 | 1/1995 | Nerone | 315/209 R |
| 5,382,881 | 1/1995 | Farkas et al. | 315/307 |
| 5,399,940 | 3/1995 | Hanna et al. | 315/129 |
| 5,412,757 | 5/1995 | Endo | 395/61 |
| 5,414,325 | 5/1995 | Allison | 315/158 |
| 5,416,386 | 5/1995 | Nilssen | 315/209 R |
| 5,426,350 | 6/1995 | Lai | 315/244 |
| 5,428,266 | 6/1995 | Nilssen | 315/209 R |
| 5,430,356 | 7/1995 | Ference et al. | 315/291 |
| 5,438,243 | 8/1995 | Kong | 315/219 |
| 5,442,259 | 8/1995 | Lameris et al. | 315/169.4 |
| 5,446,346 | 8/1995 | Nilssen | 315/209 R |
| 5,446,347 | 8/1995 | Nilssen | 315/209 R |
| 5,453,665 | 9/1995 | Konopka | 315/219 |
| 5,453,666 | 9/1995 | Brown | 315/247 |
| 5,453,668 | 9/1995 | Chow | 315/307 |
| 5,459,375 | 10/1995 | Nilssen et al. | 315/247 |
| 5,469,027 | 11/1995 | Uchihashi et al. | 315/224 |
| 5,471,117 | 11/1995 | Ranganath et al. | 315/247 |
| 5,471,118 | 11/1995 | Nilssen | 315/247 |
| 5,471,119 | 11/1995 | Ranganath et al. | 315/307 |
| 5,475,284 | 12/1995 | Lester et al. | 315/209 R |
| 5,479,074 | 12/1995 | Nilssen | 315/209 R |
| 5,485,059 | 1/1996 | Yamashita et al. | 315/307 |
| 5,486,740 | 1/1996 | Yamashita et al. | 73/1.73 |
| 5,489,823 | 2/1996 | Nilssen | 315/227 R |
| 5,491,775 | 2/1996 | Madau et al. | 395/3 |
| 5,600,211 | 2/1997 | Luger | 315/307 |

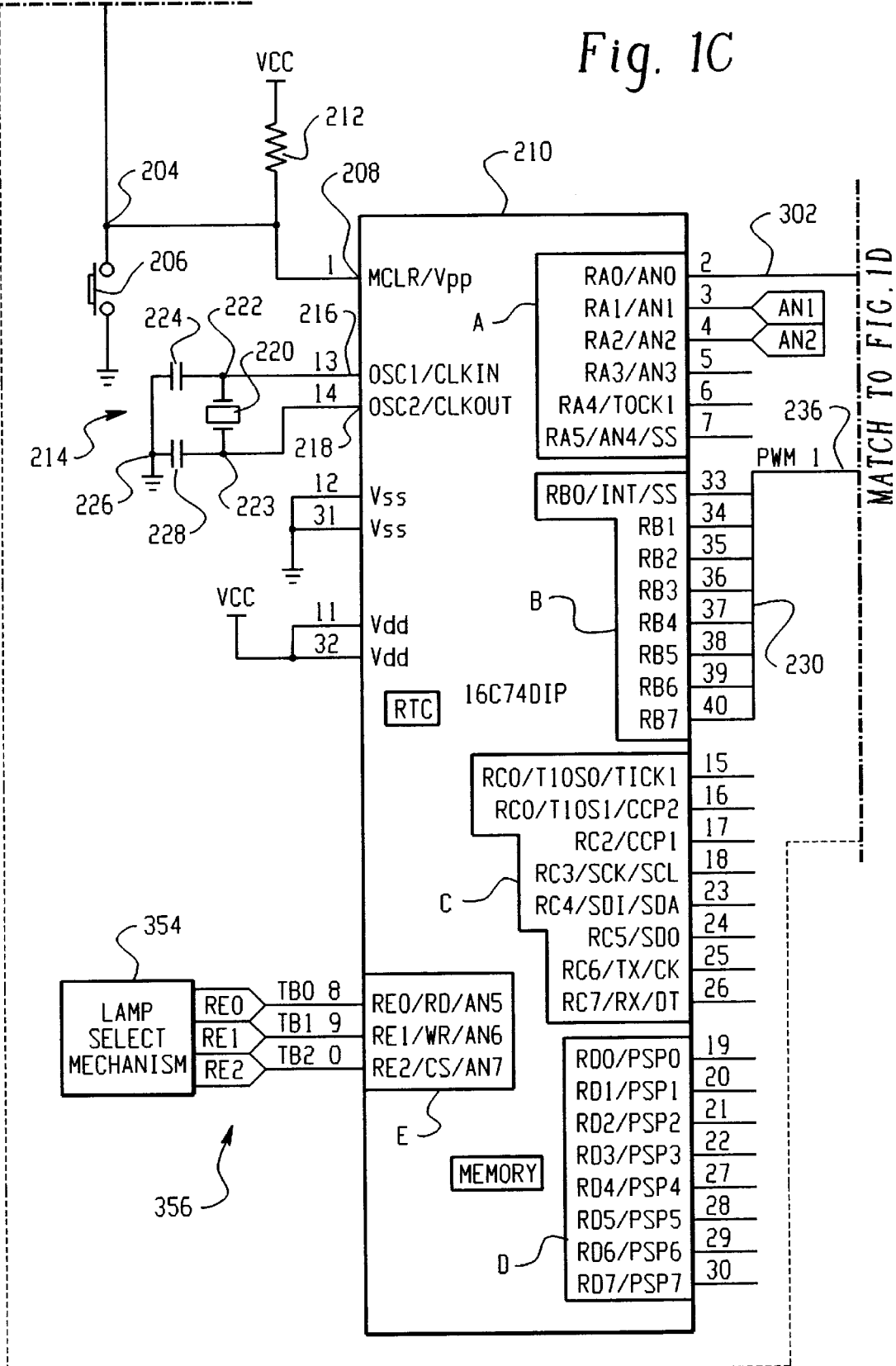

FUZZY SETPOINT TRANSFER FUNCTION

DRIVE DELTA TRANSFER FUNCTION

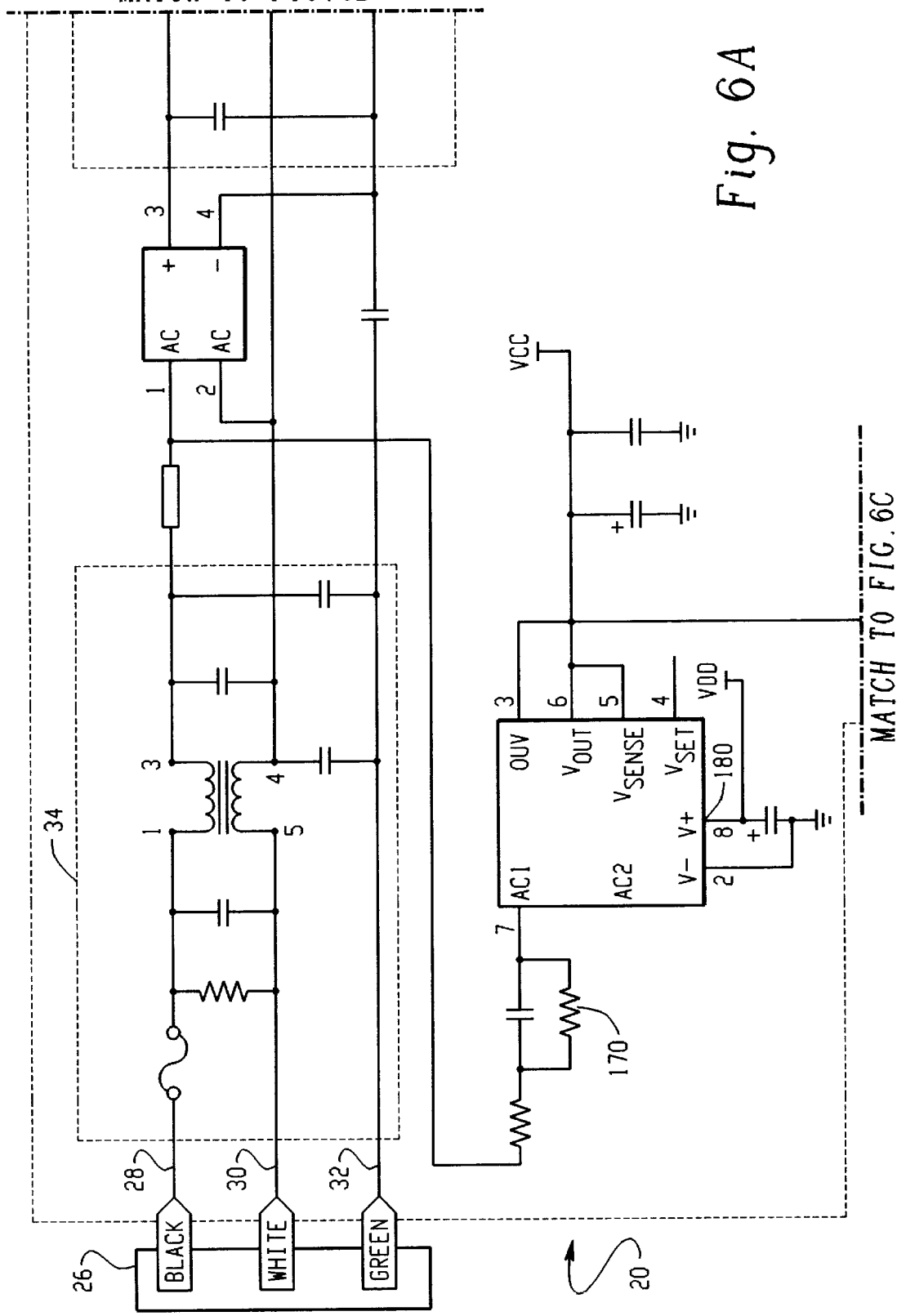

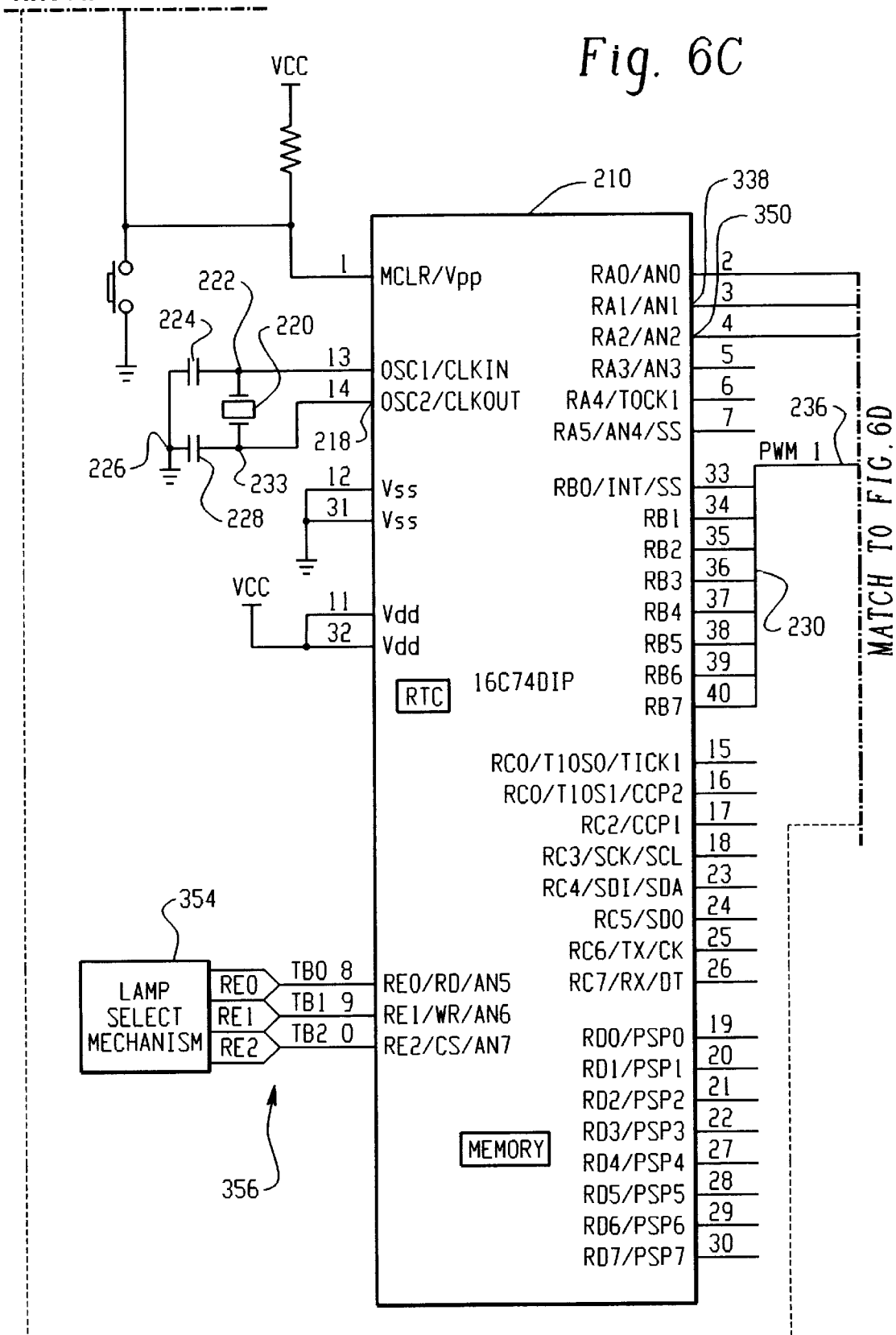

SOLID STATE BALLAST SYSTEM FOR METAL HALIDE LIGHTING USING FUZZY LOGIC CONTROL

BACKGROUND OF THE INVENTION

The present invention is directed to an electronic ballast for a direct current High Intensity Discharge (HID) lamp and is particularly directed to a microprocessor controller using fuzzy logic to control the lamp.

High Intensity Discharge lamps progress through three general operating modes. Typically, the lamp has ignition, warm-up and steady state operating modes. The ignition mode is characterized by relatively high voltage applied to the electrodes of the lamp to ionize a gas within the lamp for striking the lamp. The warm up mode typically provides electrical current to the lamp at a level which is at, or above, the steady state operating current level. The warm up period for HID lamps depends on both (i) the lamp type, i.e. metal halide, mercury, low and high pressure sodium, and (ii) the lamp wattage. Typical warm up periods from attempted lamp ignition to full steady state operation at rated lamp output is 10–20 minuets. Higher ignition current and warm up current causes more rapid electrode degradation. It is desirable to both optimize the lamp warm up period, by decreasing the time period from ignition to steady state lamp operation, and minimizing electrode degradation during lamp ignition and warm up. It is further desirable to minimize ripple in the current supplied to the lamp during operation.

SUMMARY OF THE INVENTION

The present invention provides a method and apparatus for controlling a High Intensity Discharge lamp with an electronic ballast using a fuzzy logic controller.

An apparatus in accordance with the invention for controlling a High Intensity Discharge lamp includes generating means for generating fuzzy logic transfer functions for controlling the operation of the lamp. A sensing means is included for sensing a lamp current and providing a signal indicative of the lamp current. The apparatus further includes a timing means for measuring the amount of time that the lamp is operating and providing a real time signal indicative thereof. A control means applies the fuzzy logic transfer function to control the operation of the lamp. The control means provides a control signal in response to both the signal from the sensing means and the signal from the timing means in accordance with the fuzzy logic transfer function.

A method for controlling a High Intensity Discharge lamp in accordance with the present invention comprises the steps of generating at least one fuzzy logic transfer function for controlling the operation of the lamp, sensing a lamp current, and providing a signal indicative of lamp current. The method includes the steps of measuring the amount of time that the lamp is operating and providing a real time signal indicative thereof. The method further includes the step of applying the fuzzy logic transfer function to control the operation of the lamp by providing a control signal in response to both the sensed lamp current signal and the real time signal in accordance with the fuzzy logic transfer function.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1A:
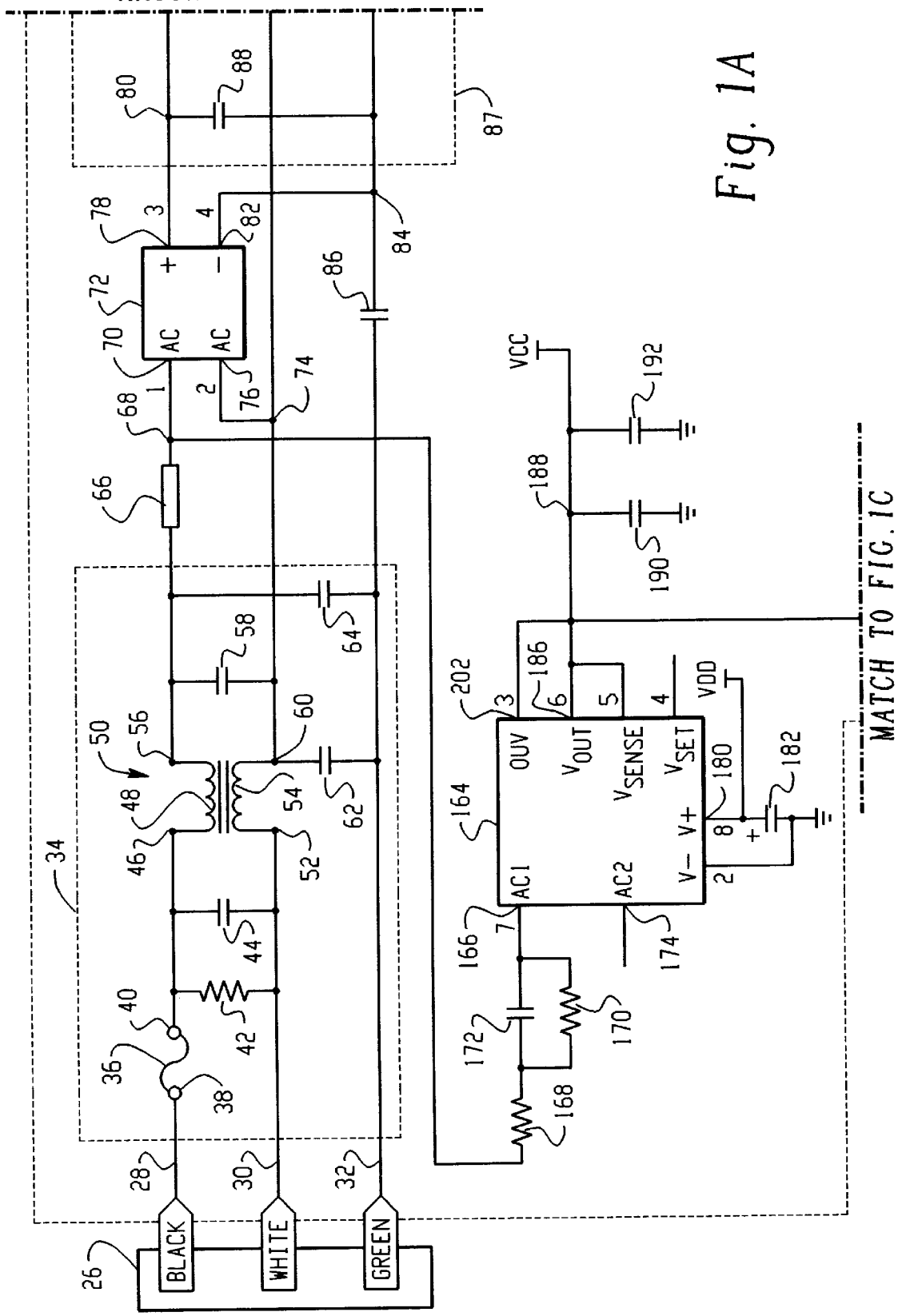
FIG. 1 is a schematic illustration showing a preferred embodiment of an apparatus for controlling a metal-halide lamp according to the system of the present invention.

Referring now to the drawings wherein the showings are for the purposes of illustrating the preferred embodiment of the invention only and not for purposes of limiting same, FIG. 1 shows a metal-halide lighting system 20 that includes an electronic ballast 22 and a lamp 24. The electronic ballast 22 is electrically connected to a source of electrical energy 26 with main input lines 28, 30, 32. Preferably, the source of electric energy is an alternating current source. In the present example, the input voltage from the source 26 to the ballast 22 is 120 volts or 277 volts. The electronic ballast 22 of the present invention is adaptable for use with the typical line voltages available shown above. It is to be appreciated that other operating voltages can be used and the present invention is not limited to the typical voltages above.

The main input lines 28, 30, 32 are electrically connected to a noise suppression and safety circuit 34 in the ballast 22. The noise suppression circuit and safety circuit 34 has a fuse 36 connected to the line 28 at a terminal 38. The fuse 36 has a second terminal 40 connected to one terminal of a resistor 42 and one terminal of a capacitor 44. The other terminal of the resistor 42 and the other terminal of the capacitor 44 are connected to the line 30. The line 28 is electrically connected to a first terminal 46 of a first coil 48 of a transformer 50. The line 30 is electrically connected to a second terminal 52 of a second coil 54 of the transformer 48. A second terminal 56 of the first coil 48 is electrically connected to one of a capacitor 58. The other terminal of the capacitor 58 is connected to a second terminal 60 of the second coil 54. The coils 48, 54 of the transformer 50 serve as inductors for the noise suppression circuit 34. The terminal 60 is electrically connected to one terminal of a capacitor 62. The other terminal of the capacitor 62 is connected to the line 32. The terminal 56 is electrically connected to one terminal of a capacitor 64. The other terminal of the capacitor 64 is connected to the line 32. The noise suppression circuit 34 reduces Electro Magnetic Interference to prevent noise from entering and leaving the electronic ballast circuit 22. The capacitors 62, 64 are line-bypass capacitors.

An in-rush limiter 66 is serially connected in the line 28 and has one end connected to the junction formed by the terminal 56 and capacitors 58, 64. The other end of the in-rush limiter 66 is connected to a junction 68. The junction 68 is electrically connected to a first input 70 of a full wave bridge rectifier 72. The terminal 60 of the transformer 50 is electrically connected to a junction 74. The junction 74 is electrically connected to a second input terminal 76 of the rectifier 72.

A first output 78 of the rectifier 72 is electrically connected to a junction 80. A second output 82 of the rectifier 72 is electrically connected to a junction 84. In the line 32, a capacitor 86 has one end connected to the junction formed by the capacitors 62, 64. The other end of the capacitor 86 is electrically connected to the junction 84.

A direct current filtering circuit 87 includes a capacitor 88 that has one end connected to the junction 80 and the other end connected to the junction 84. The capacitor 88 provides high frequency filtering. A first jumper terminal 90 is electrically connected to the junction 74. A second jumper terminal 92 is electrically connected to a junction 94. A jumper 96 electrically connects the terminal 90 to the terminal 92 when the voltage supplied to the ballast 22 is 120 volts. The terminals 90 and 92 are open circuited when the voltage supplied to the ballast is 277 volts, i.e. the jumper 96 is not installed. A resistor 98 has one end electrically connected to the junction 80 and the other end electrically connected to the junction 94. A resistor 100 has one end electrically connected to the junction 94 and the other end electrically connected to the junction 84. A capacitor 102 has one terminal electrically connected to the junction 80 and the other terminal electrically connected to the junction 94. A capacitor 104 has one terminal electrically connected to the junction 94 and the other terminal electrically connected to the junction 84. The junction 84 is electrically connected to electrical ground. The DC filtering circuit 87 has a first output terminal 106 and a second output terminal 108. The DC filtering circuit 87 provides a filtered electrical supply of approximately 300 Vdc on outputs 106, 108.

The anode of a diode 110 is electrically connected to the output 108. The cathode of the diode 110 is connected to a junction 112. A resistor 114 has one end connected to the junction 112. The other end of the resistor 114 is connected to a junction 116. A capacitor 118 has one end connected to the junction 112 and the other end connected to the junction 116. The resistor 114 and the capacitor 118 form a noise suppression circuit 120. A diode 122 has an the anode electrically connected to the junction 112. The cathode of the diode 122 is electrically connected to the junction 116.

A high voltage lamp ignition circuit 124 has a resistor 126. One end of the resistor 126 is electrically connected with a junction 127 that is electrically connected to the junction 116. The other end of the resistor 126 is connected to a junction 128. A sidac 130 has its cathode electrically connected to the junction 128 and its anode electrically connected to a junction 131 which is electrically connected to the junction 112. A capacitor 132 has one end connected to the junction 128 and the other end connected to a first terminal 134 of a first coil 136 of a transformer 138. A second terminal 140 of the first coil 136 is electrically connected to the junction 131. An inductor 152 has one end electrically connected to the junction 131. The other end of the inductor 152 is connected to a junction 154. A resistor 156 and a ferrite bead inductor 158 are parallel connected, each having one end connected to the junction 154 and having their respective other end electrically connected to a junction 160. A diode 162 has its anode electrically connected to the junction 160 and its cathode electrically connected to the junction 127.

The transformer 138 has a second coil 142. The second coil 142 has a first terminal 144 and a second terminal 146. The first terminal 144 is electrically connected to the first terminal 134 of the first coil 136. The second terminal 146 of the second coil 142 is electrically connected to a cathode 148 of the lamp 24. An anode 150 of the lamp 24 is electrically connected to the junction 127 in the high voltage lamp ignition circuit 124.

An AC/DC converter 164 has a first input 166 electrically connected to the first main line 28 at the junction 68 through a resistor 168 series connected to a parallel combination of a resistor 170 and a capacitor 172. Converter 164 provides low voltage logic supply voltage. An output 180 provides logic voltage $V_{DD}$, which is approximately 12 Vdc. The output 180 is connected to electrical ground through a capacitor 182. An output 186 of the AC/DC converter 164 is electrically connected to a junction 188 that provides logic voltage $V_{CC}$, which is approximately 5 Vdc. A capacitor 190 and a capacitor 192 each have one terminal electrically connected to the junction 184 and their other respective terminal connected to electrical ground. An output 202 is connected to a junction 204. A switch 206 is connected between the junction 204 and electrical ground. Preferably, the switch is a normally open push button switch. The switch 206 is used for a manual reset of the system. A device suitable for use as the AC/DC converter 164 is available as model MAX611 AC/DC converter from Maxim Integrated Products, Inc. located in Sunnyvale, Calif.

One terminal of a resistor 212 is electrically connected to the voltage source $V_{CC}$. The other terminal of the resistor 212 is electrically connected to a master clear input 208 of a controller 210 and the junction 204. Preferably the controller 210 is a microprocessor controller that includes a CPU, internal memories, internal timers, internal buffers, internal registers, a pulse width modulation (PWM), and an internal A/D converter as is known in the art. A device suitable for use as the microprocessor controller 210 in the present invention is available as model 16C74 microprocessor from Microchip Technology Incorp. located in Chandler, Ariz. Is to be appreciated that other suitable microprocessors and micro-controllers may be used in the present invention.

A clock oscillator 214 is operatively connected to the controller 210 at an input 216 and a pin 218. A crystal oscillator 220 is connected to the input 216 at a junction 222. The other end of the crystal oscillator is connected to the pin 218 at a junction 223. A capacitor 224 has one end connected to the junction 222 and the other end connected to electrical ground at a junction 226. A capacitor 228 has one end connected to the junction 223 and the other end connected to electrical ground at the junction 226. Preferably, the crystal oscillator 220 is a 20 MHz oscillator.

A PWM output 230 is in data communication with (i) an interrupt input 236 of the controller 210, and (ii) a logic driver 232. The PWM output 230 provides Pulse Width Modulated (PWM) control signals to an input 234 of the logic driver 232. The freguency and duty cycle of the PWM signal is controlled by the controller 210 in response to sensed lamp operating characteristics, such as current, and lamp operating parameters such as wattage, voltage. Lamp operating parameters and characteristics vary depending (i) on the type of lighting source driven by the ballast 22, and (ii) the desired lamp output or other desired operating characteristic such as power factor.

The input terminal 234 of the driver 232 is electrically connected to electrical ground through a resistor 238. An output 240 of the driver 232 is connected to a junction 242.

The logic driver 232 may suitably be a dual non-inverting MOSFET integrated circuit such as model MAX4427 from Maxim Corp. located in Sunnyvale, Calif.

A diode 244 has its cathode connected to the junction 242 and its anode connected to electrical ground. A resistor 246 has one end connected to the junction 242 and the other end connected to a junction 248. The junction 248 is connected to electrical ground through a resistor 250.

A transistor 252 has its gate electrically connected to the junction 248. The drain of the transistor 252 is electrically connected to the junction 154. The source of the transistor 252 is connected to a junction 254. A resistor 256 is connected between the junction 254 and a junction 258. A diode 260 has its anode connected to the junction 258 and its cathode connected to electrical ground.

A first end 261 of a resistor network 262 is electrically connected to the junction 254. A second end 263 of the resistor network 262 is electrically connected to the junction 258. Preferably, the resistor network 262 has eight resistors connected in a known manner for differentially sensing a voltage developed across the resistor 256 when current flows through the resistor 256. A capacitor 264 is advantageously connected to the resistor network 262 to provide high frequency filtering, as is known in the art. A terminal 266 of the resistor network 262 is connected to electrical ground.

A terminal 268 of the resistor network 262 is electrically connected to a plus input 270 of a first operational amplifier 272. A terminal 274 of the resistor network 262 is electrically connected to a minus input 276 of the operational amplifier 272. An output 278 of the operational amplifier 272 is electrically connected to a plus input 280 of a second operational amplifier 282 via a junction 284. A resister 286 is electrically connected between the junction 284 and the minus input 276 of the first operational amplifier 272. An output 288 of the second operational amplifier 282 is connected to the anode of a diode 290. Operational amplifiers 272 and 282 are preferably contained in a single supply dual operational amplifier integrated circuit.

The cathode of the diode 290 is connected to a junction 292. The junction 292 is connected to electrical ground through a capacitor 294. A resistor 296 has one end connected to the junction 292 and its other end connected to the low side of the capacitor 294 at a junction 298. A minus input 300 of the second operational amplifier 282 is electrically connected to the junction 292. The junction 292 is electrically connected to an analog input 302 of the controller 210 through a line 304. The analog input 302 is electrically connected to an internal analog-to-digital converter of the controller 210 as is known in the art. An external A/D converter may be used to provide a digital input signal for use by the controller 210.

During operation of the metal-halide lighting system 20, 120 Vac or 277 Vac is provided from the source of electrical power 26 to the electronic ballast 22 through the main lines 28, 30, 32. The electrical current on the line 28 passes through the fuse 36 which provides overcurrent protection. The supply current then passes through the noise suppression circuit 34 which prevents noise from both entering and leaving the circuit 34.

The maximum current draw from the mains 28, 30, 32 is limited by the in-rush limiter 66. The in-rush limiter 66 limits the current drawn during the initial charging of the capacitors 102 and 104. The capacitors 102, 104 act as short circuits when they are initially charged. As electrical current passes through the in-rush limiter 66, internal heating causes its resistance to decrease thereby advantageously reducing the current limiting action of the in-rush limiter 66 as the capacitors 102 and 104 are charged.

The AC voltage is rectified by the bridge rectifier 72 to supply approximately 300 Vdc supply to the lamp 24. The capacitors 102 and 104 filter the DC voltage. The jumper 96 is set according to the AC voltage supplied to the mains 28, 30, 32. The jumper 96 is present for 120 volt AC supply and the jumper 96 is absent for 277 volt AC supply. The capacitor 88 provides high frequency filtering. The resistors 98 and 100 balance the voltage across capacitors 102 and 104.

The junction 68 is connected to the low voltage logic supply 164. The low voltage supply 164 receives the AC input and converts it to DC voltages $V_{CC}$, $V_{DD}$ to be used by logic level circuits in the ballast system. The resistor 168, capacitor 172 and resistor 170 limit current flow into the input 166 of the logic supply 164. The electrical components 168, 172, and 170 provide electrical isolation between the AC voltage present on the main lines 28, 30, 32 and the logic voltages $V_{CC}$, $V_{DD}$. The capacitors 190 and 192 provide DC filtering. The capacitor 182 is operatively connected to the logic supply 164 to provide filtering for an internal voltage regulator (not shown for clarity of illustration) of the logic supply 164. The voltage $V_{DD}$ of the capacitor 182 is supplied to the driver 232 to provide the MOSFET drive voltage needed to control the switching of the MOSFET 252.

A lamp selector mechanism 354 is operatively connected to inputs 356 of port "E" of the controller 210. The lamp selector mechanism 354 is used to provide a signal to the controller 210 selecting a desired fuzzy logic transfer function from the memory of the controller for a specific lamp type and wattage. A suitable apparatus for the lamp selector mechanism 354 is a known thumb wheel with pull up resistors (not shown).

Upon system start up, the logic supply 164 provides a Master Clear ("MCLR") signal from the output 202 to the input 208 of the controller 210. The MCLR signal resets the controller 210 and the controller begins to execute the software programming from the beginning. The PWM output 230 of the controller 210 is LOW, thereby maintaining the transistor 252 in the OFF condition. Next, in accordance with the software program of the controller 210, the PWM output 230 begins providing pulses at a predetermined frequency and duty cycle. When the PWM control signal is a logic HIGH, the output 240 of the driver 232, which is fed by the MOSFET drive voltage $V_{DD}$, turns the transistor 252 ON thereby causing it to conduct electrical current. The resistor 238 insures that the transistor 252 does not conduct current during start up of the controller 210. The diode 244 provides negative transient protection to the gate of the transistor 252. The resistors 246 and 250 provide bias for the transistor 252.

When the transistor 252 is turned ON, electrical current flows through the path including the resistor 126, the capacitor 132, the transformer 138, the inductor 152, the resistor 256, the transistor 252, and the diode 260. When electrical current flows in the described path, the capacitor 132 charges up over time. When the voltage across the capacitor 132 reaches approximately 250 Vdc, the sidac 130 short circuits the junction 128 to the junction 131 thereby causing the capacitor 132 and the transformer 138 to discharge. The discharge of the capacitor 132 and the transformer 138 causes a high voltage pulse to be applied to the cathode 148 of the lamp 24. The high voltage pulse is preferably −2.7 kV for 1.5 $\mu$sec. which causes the gas in the lamp to ionize thereby enabling the formation of an arc to ignite the lamp.

The high voltage pulse is limited to a negative 4 kV maximum by the circuit design in order to meet safety compliance standards.

If the lamp 24 fails to ignite, the charge and discharge sequence of the capacitor 132 and transformer 138 continues when the PWM output 230 provides control pulses to the driver 234. For the purpose of lamp ignition, the high voltage pulses are provided at a rate of 120 Hz. The pulse rate during ignition is selected based upon specific lamp operating parameters provided by the lamp manufacturer. The rate of the high voltage pulses is provided in accordance with suitably selected values of the resistor 126 and the capacitor 132.

Upon lamp 24 ignition, electrical current flows through the lamp and lamp current is sensed. An electrical signal indicative of the sensed current flow is provided to the input 302 of the controller 210. The controller 210 regulates the duty cycle of the PWM control signal provided at the PWM output 230. Initially, for lamp operation after ignition, the PWM control signal provided at the PWM output 230 is configured to provide a signal at 44.25 kHz at a 20% duty cycle. The duty cycle regulated PWM control signal is used to control the current through the lamp 24 by controlling the transistor 252. It is to be understood that the duty cycle may be the same or different than the duty cycle used to ignite the lamp 24.

When the transistor 252 is conducting electrical current, electrical energy is stored in the inductor 152. When the transistor 252 is turned OFF, the energy stored in the inductor 152 keeps electrical current flowing through the lamp 24 in the path that includes the resistor 156, the inductor 158, and the diode 162. The resistor 156 and the inductor 158 suppress electro magnetic interference. The cycle of charging and discharging of the inductor 152 through the path including the diode 162 is continuous in response to the state of conduction of the transistor 252 in response to the PWM control signal at the output 230.

The electrical current that flows across the inductor 152 when the transistor 252 is ON develops a voltage across the resistor 256. This voltage is differentially sensed by the resistor network 262. The capacitor 264 advantageously provides high frequency filtering. The sensed voltage across the resistor 256 is amplified by the operational amplifier 272. The output 278 of the op amp 272 provides a ramp signal that has a peak which is detected by the circuit including the op amp 282, the diode 290, the capacitor 294, and the resistor 296. The op amp 282 tracks the electrical signal on the output 278 of the op amp 272. When the voltage value across the capacitor 294 is less than the voltage value at the output 288 of the op amp 282, the diode 290 is forward biased and conducts electrical current thereby charging the capacitor 294 until the capacitor 294 reaches the peak voltage on output 288 of op amp 282. Once the voltage value of the ramp reaches its peak, and begins to decrease, the voltage across the capacitor 294 is greater than the voltage on the output 288. The diode 290 is reverse biased thus preventing the voltage on the capacitor 294 from following the signal on the output 288 of the op amp 282. Consequently, the peak charge on the capacitor 294 represents the peak amplified voltage across the resistor 256 which is indicative of the current flowing through the lamp 24 when the transistor 252 is in the ON condition.

Figure 2:
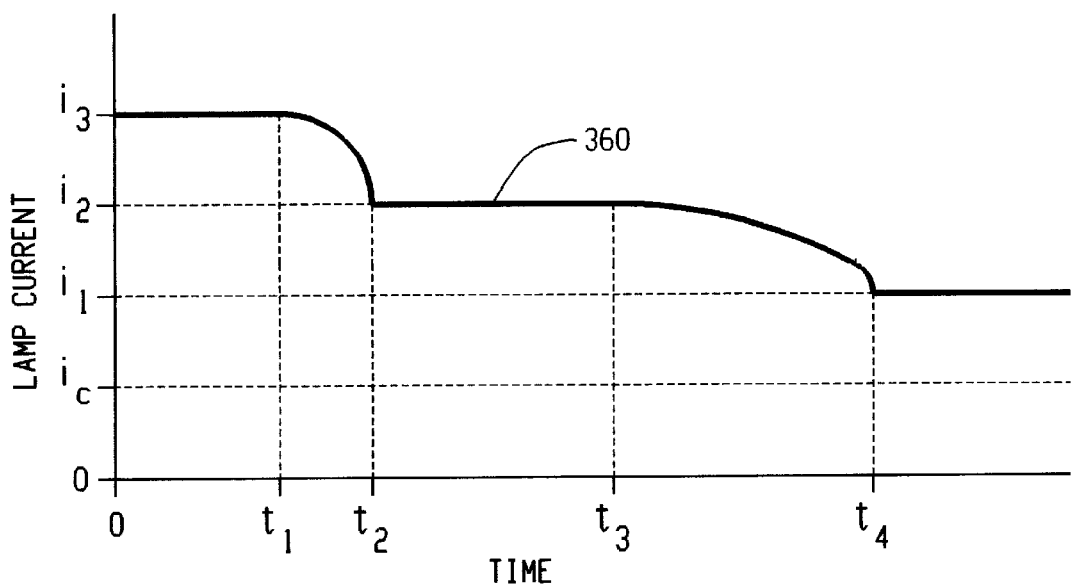
FIG. 2 is a graph of a transfer function of the desired lamp current as a function of time.

The voltage across the capacitor 294 reaches its peak level when a PWM control pulse from the PWM output 230 terminates. At that time, the trailing edge of the pulse causes an interrupt in the controller 210 through the interrupt input 236. This interrupt signals the controller 210 to begin measuring the peak voltage on capacitor 294. The digitized voltage value is indicative of lamp current and is compared in the controller 210 against the desired lamp operating current for a specific instant in real time as shown in FIG. 2. The difference between the desired lamp operating current shown in FIG. 2 and the value indicative of sensed lamp current is the error current value. The error current value is in units of amps.

Referring to FIG. 2, a graph of a current setpoint transfer function 360 versus time is shown. The transfer function 360 is developed using a fuzzy logic development software package 368 (FIG. 7) for the specific microprocessor selected for use as the controller 210. The fuzzy logic software package 368 is run on a suitable computer system (not shown) to generate the fuzzy transfer functions 360 and 362 that are to be stored in the controller 210. One skilled in the art will appreciate that the transfer functions 360 and 362 may be stored for use by the controller 210 in the form of a look-up table or as an algorithm. A suitable fuzzy logic development software package for use in the present invention is available as Fuzzy TECH-MP made by Inform Software Corp., located in Evanston, Ill. It uses known methods to (i) describe the fuzzification and defuzzification membership functions, (ii) create the high level fuzzy code, and (iii) compile the high level fuzzy code into microprocessor specific assembly language.

Figure 7:
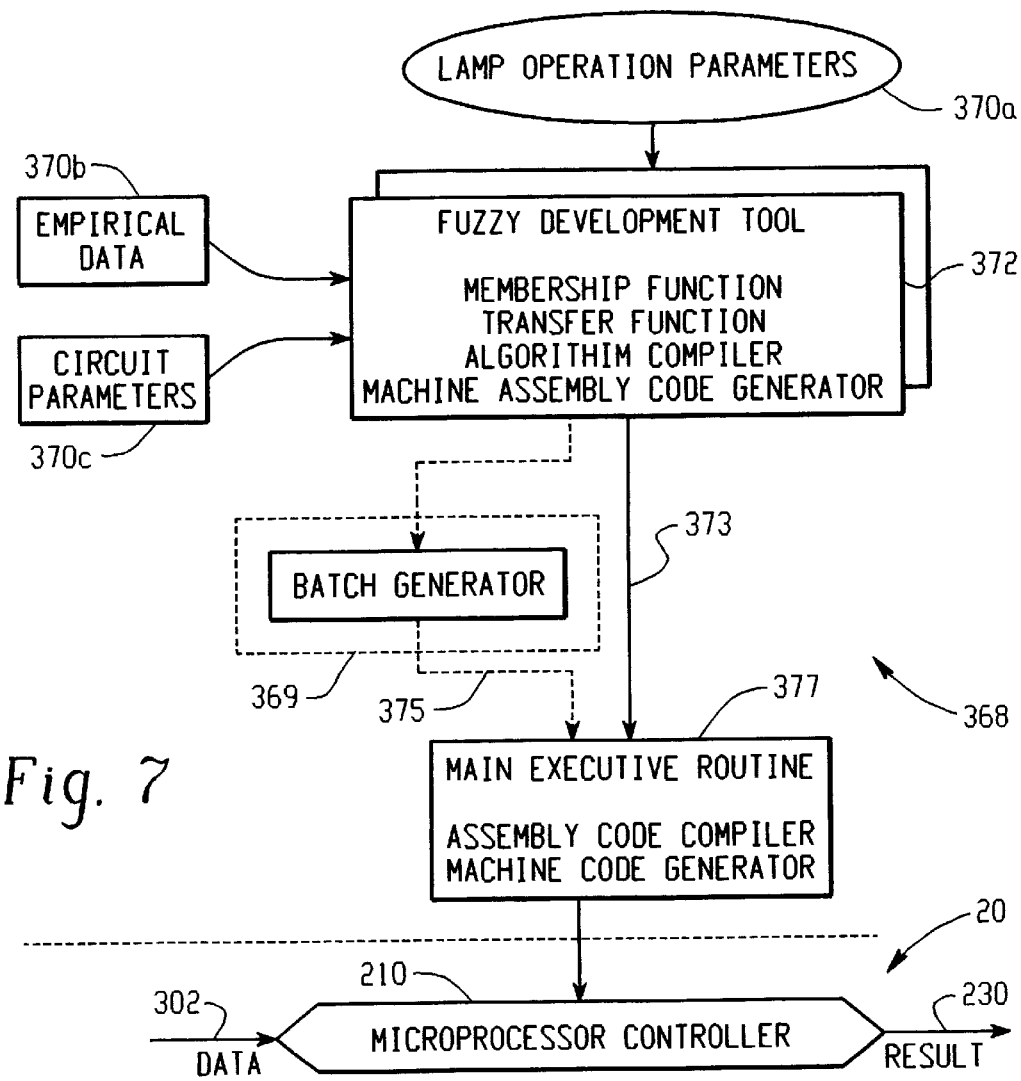
FIG. 7 is a functional block diagram illustrating the generation of fuzzy logic transfer functions for use in the present invention.

Referring to FIG. 7, generation of the fuzzy software transfer functions is represented by the functional block diagram including a fuzzy pattern data blocks 370a, 370b and 370c, and a fuzzy engine 372. The fuzzy transfer functions are developed using the fuzzy logic software on a suitable stand alone computer 368. Preferably, the lamp operating parameters 370a (i.e. wattage, voltage, current, etc.), empirical data 370b (i.e. manual changes to the fuzzy transfer function using the software package) and the current parameters 370c (i.e. PWM resolution, ripple and circuit resolution relationships, etc.) Are provided to the fuzzy development tool 372. The fuzzy development tool 372 develops the fuzzy logic transfer functions 360 and 362 as described below. The fuzzy transfer functions are provided as an algorithm subroutine on a line 373 to the main executive routine 377. A suitable software tool to development the main executive routine is microchip MPASM from Microchip Corp. of Chandler, Arizona. The fuzzy code is then inserted into the executive program in the controller 210 as a subroutine and processed according to the flow diagrams shown in FIGS. 4A, 4B and 5 as described below. The lamp current signal data is received on the input 302 and the PWM control signal, the result, is provided on the output 230. For this embodiment two fuzzy logic algorithm routines are developed: setpoint and PWM_Drive. Alternatively, the fuzzy development tool 372 can create a look-up table using a batch generator 369 and providing the data points of the look-up table to the main executive routine 377 via line 375.

The fuzzy setpoint transfer function is generated in the fuzzy software package 372 as follows. The fuzzification processing blocks within the setpoint routines are Run_ Time and Setpoint. The fuzzification variables for the processing blocks are Run_Time_Seconds and Setpoint_ Amps. The variable Setpoint_Amps is representative of the sensed voltage that is indicative of lamp current.

There are three terms in the Run_Time_Seconds variable: Ignition, Warm_Up, and Steady_State. The terms in the Setpoint_Amps variable are: Off, Run_Ref, Warm up_Ref, Ignition_Ref, and Overcurrent. Each of these terms define a segment of their respective variables. The variable Run Time Seconds is defined as existing from zero (0) seconds to 150 seconds for use in the software package in developing the transfer function. The Ignition term is defined as existing from zero (0) seconds to 17 seconds. The Warm_Up term is defined as existing from 6 seconds to 103 seconds. The Steady_State term is defined as existing from 51 seconds to 150 seconds. The time periods described above are allocated according to particular ignition and warm up cycles required for optimum lamp performance and warm up for a selected lamp wattage and lamp type.

The variable Setpoint_Amps is defined as existing from zero (0) amps to 1.2 amps. The term Off is defined from zero (0) amps to 0.107784 amps. The term Run_Ref is defined as existing from 0.007186 amps to 0.797605 amps. The term Warm_Up_Ref is defined as existing from 0.467066 amps to 1.027545 amps. The term Ignition_Ref is defined as existing from 0.819162 amps to 1.192814 amps. The Overcurrent term is defined as existing from 1.034731 amps to 1.2 amps. One skilled in the art will appreciate that while the actual parameter controlled in the lamp is current, the voltage signal provided to the controller 210 on the input 302 is representative of lamp amps and the input voltage value is selectively scalable to provide convenient ease of comparison, analysis, and computation in the controller 210.

The Warm_Up and Warm_Up_Ref terms have triangular membership functions that are used between the segments identified above. The remaining terms described above utilize a trapezoidal membership function. Using the fuzzy development software package, IF-THEN relationships, or rules, are developed between the terms of the fuzzification module Run_Time_Seconds and the defuzzification module Setpoint_Amps. The fuzzy development software subsequently generates the high level language shown below in Table 1 for the SETPOINT fuzzy routine used in the control process.

TABLE 1

```
PROJECT {
    NAME=SETPOINT·FTL;
    DATEFORMAT=M.D.YY;
    LASTCHANGE=3.23.96;
    CREATED=8.8.95;
    SHELL=EXPLMP;
    SHELLOPTIONS {
        ONLINE_REFRESHTIME=55;
        ONLINE_TIMEOUTCOUNT=0;
        ONLINE_CODE=OFF;
        TRACE_BUFFER=(OFF,PAR(255));
        BSUM_AGGREGATION=OFF;
        PUBLIC_IO=ON;
    FAST_CMBF=ON;
    FAST_COA=OFF;
    SCALE_MBF=OFF;
    FILE_CODE=OFF;
    BTYPE=8_BIT;
}/*SHELLOPTIONS*/
MODEL {
    VARIABLE_SECTION{
        LVAR{
            NAME=RUN_TIME;
            BASEVAR=RUN_TIME_SECOND;
            LVRANGE=MIN(0.000000), MAX(150.000000),
                MINDEF(0), MAXDEF(150),
                DEFAULT_OUTPUT (0.000000);
            RESOLUTION=XGRID(0.000000), YGRID(1.000000),
                SHOWGRID(OFF),SNAPTOGRID(ON);
            TERM {
                TERMNAME=IGNITION;
                POINTS=(0.000000, 1.000000),
                    (4.000000, 1.000000)
```

TABLE 1-continued

```
                    (17.000000, 0.000000),
                    (150.000000, 0.000000);
                SHAPE=LINEAR;
                COLOR=RED (255), GREEN (0), BLUE (0);
            }
            TERM {
                TERMNAME=WARM UP;
                POINTS=(0.000000, 0.000000),
                    (6.000000, 0.000000),
                    (30.000000, 1.000000),
                    (103.000000, 0.000000),
                    (150.000000, 0.000000);
                SHAPE=LINEAR;
                COLOR=RED (0), GREEN (255), BLUE (0);
            }
            TERM {
                TERMNAME=STEADY_STATE;
                POINTS=(0.000000, 0.000000),
                    (51.000000,, 0.000000),
                    (150.000000, 1.000000);
                SHAPE=LINEAR;
                COLOR=RED (0), GREEN (0), BLUE (255);
            }
    } /*LVAR/*
    LVAR {
        NAME=SETPOINT;
        BASEVAR=SETPOINT_Amps;
        LVRANGE=MIN(0.000000),MAX(1.200000),
            MINDEF(0),MAXDEF(167),
            DEFAULT_OUTPUT(0.000000);
        RESOLUTION=XGRID(0.000000), YGRID(1.000000),
            SHOWGRID)OFF), SNAPTOGRID(ON);
        TERM {
            TERMNAME=OFF;
            POINTS=(0.000000, 1.000000),
                (0.007186, 1.000000),
                (0.107784, 0.000000),
                (1.200000, 0.000000);
            SHAPE=LINEAR
            COLOR=RED (255), GREEN (0), BLUE (0);
        }
        TERM {
            TERMNAME=RUN_REF;
            POINTS=(0.000000, 0.000000),
                (0.007186, 0.000000),
                (0.617964, 1.000000),
                (0.632335, 1.000000),
                (1.2000000, 0.000000);
            SHAPE=LINEAR;
            COLOR=REC (0), GREEN (255), BLUE (0);
        }
        TERM {
            TERMNAME=WARMUP_REF;
            POINTS=(0.000000, 0.000000),
                (0.596407, 0.000000),
                (0.797605, 1.000000)
                (1.027545, 0.000000),
                (1.200000, 0.000000);
            SHAPE=LINEAR;
            COLOR=RED (0), GREEN (0), BLUE (255);
        }
        TERM {
            TERMNAME=IGNITION_REF;
            POINTS=(0.000000, 0.000000)
                (0.819162, 0.000000),
                (0.998802, 1.000000),
                (1.013174, 1.000000),
                (1.192814, 0.000000)
                (1.200000, 0.000000);
            SHAPE=LINEAR;
            COLOR=RED (128), GREEN (0), BLUE (0);
        }
        TERM {
            TERMNAME=OVERCURRENT;
            POINTS=(0.000000, 0.000000),
                (1.034731, 0.000000),
                (1.200000, 1.000000);
            SHAPE=LINEAR;
            COLOR=RED (0), GREEN (128), BLUE (0);
```

TABLE 1-continued

```
        }
    }/*LVAR*/
}/*VARIABLE_SECTION*/
OBJECT_SECTION {
    INTERFACE {
        OUTPUT=(SETPOINT, COM);
        POS=46, -73;
        RANGECHECK=ON;
    }
    INTERFACE {
        INPUT=(RUN_TIME, FCMBF);
        POS=-219, -191;
        RANGECHECK=ON;
    }
    RULEBLOCK {
        INPUT=RUN_TIME;
        OUTPUT=SETPOINT;
        AGGREGATION=(MIN_MAX, PAR(0.000000));
        COMPOSITION=(GAMMA, PAR(0.000000));
        POS=-161, -109;
        RULES {
            IF RUN_TIME=STEADY_STATE
            THEN SETPOINT=RUN_REF WITH 1.000;
            IF RUN_TIME=WARM_UP
            THEN SETPOINT=WARMUP_REF WITH 1.000;
            IF RUN_TIME=IGNITION
            THEN SETPOINT=IGNITION_REF WITH 1.000;
        }/*RULES*/
    }
    }/*OBJECT SECTION*/
    }/*MODEL*/
}/*PROJECT*/
TERMINAL {
    BAUDRATE=19200;
    STOPBITS=1;
    PROTOCOL=NO;
    CONNECTION=NOPORT;
    INPUTBUFFER=1024;
    OUTPUTBUFFER=1024;
}/*TERMINAL*/
TERMINAL {
    BAUDRATE=19200;
    STOPBITS=1;
    PROTOCOL =NO;
    CONNECTION=NOPORT;
    INPUTBUFFER=1024;
    OUTPUTBUFFER=1024;
}/*TERMINAL*/
```

A simulator built into the development software allows analysis of the resulting transfer function with simulated real time clock values applied to the routine. The transfer function is empirically tuned and adjusted by changing the relationship of the various terms in each of the two modules until the desired lamp current fuzzy setpoint transfer function is obtained for the specific type of lamp and wattage. When the desired transfer function has been achieved, the development software compiles the code and generates assembly code for the specific selected controller 210. The assembly code is then stored in the memory of the controller 210 and is called as a subroutine by the executive program.

A suitable fuzzy setpoint transfer function can be obtained using other input variables and a single membership function. One skilled in the art will appreciate that the ranges for the reduced number of terms are different than the ranges specified in the example shown above that includes more terms.

The PWM_DRIVE fuzzy routine is developed using the fuzzy logic development software package described above. The fuzzification processing blocks are Drive_Error and PWM_Delta. The fuzzification variables for the processing blocks are defined as Error_Current and Count_Change.

The terms for the Error_Current variable are: Huge_Error, Low_Error, No_Error, Min_Error, and Max_Error.

The terms for the Count_Change variable are: Huge_Change, Low_Change, No_Change, Min_Change, and Max_Change. Each of these terms define a segment of their respective variables. The ranges for the Error_Current terms are defined as follows: Huge_Error is defined as existing from 0.642857 amps to 1.192857 amps; Low_Error is defined as existing from 0.064286 amps to 0.285714 amps; No_Error is defined as existing from 0 amps to 0.171429 amps; Min_Error is defined from 0.185714 amps to 0.514286 amps; and Max_Error is defined from 0.3500 amps to 1.200 amps. Recall that, while the actual parameter controlled in the lamp is current, the voltage value provided at the input 302 is for ease of analysis and computation. The Huge_Error term is a trapezoidal membership function and the remaining terms are triangular membership functions.

The Count_Change variables are scaled from zero (0) to thirty (30) counts. The Huge_Change term is defined from 14 counts to 30 counts. The Low_Change term is defined from 0 counts to 9 counts. The No_Change term is defined from 0 counts to 4 counts. The Max_Change term is defined from 1 count to 10 counts. The Max_Change term is defined from 4 counts to 19 counts. The relationship of these terms are key determinants in the amount of current ripple experienced by the lamp. A count is equivalent to the PWM resolution according to the number of bits available to the PWM at a specific frequency. These relationships effect (i) the rate with which the control system locks into (i) the setpoint value, (ii)the system stability, (iii)the speed of the microprocessor controller system, (iv) and the final error existing between the Setpoint_Amps and the sensed lamp current value. These terms are tuned to optimize lamp performance with the selected power conversion and controller circuit.

As in the previously described fuzzy block, the shape of the membership functions is not limited to triangular or trapezoidal shapes. What is critical is the final transfer function that results when an error current is passed to the fuzzy routine. The relationship, or rules, between the two fuzzy modules Error_Current and Count_Change in the fuzzy PWM_Drive routine are arranged with the aid of the fuzzy development software and results in the high level code shown below in Table 2.

TABLE 2

```
PROJECT {
    NAME=PWMDRIVE~FTL;
    DATEFORMAT=M.D.YY;
    LASTCHANGE=9.9.95;
    CREATED=8.8.95;
    SHELL=EXPLMP;
    SHELLOPTIONS {
        ONLINE_REFRESHTIME=55;
        ONLINE_TIMEOUTCOUNT=0;
        ONLINE_CODE=OFF;
        TRACE_BUFFER=(OFF,PAR(255));
        BSUM_AGGREGATION=OFF;
        PUBLIC_IO=ON;
        FAST_CMBF=ON;
        FAST_COA=OFF;
        SCALE_MBF=OFF;
        FILE_CODE=OFF;
        BTYPE=8_BIT;
    }/*SHELLOPTIONS*/
    MODEL {
        VARIABLE_SECTION{
            LVAR{
                NAME=DRIVE_ERROR;
                BASEVAR=ERROR_CURRENT;
                LVRANGE=MIN(0.000000), MAX(1.200000),
                    MINDEF(0), MAXDEF(168),
```

TABLE 2-continued

```
        DEFAULT_OUTPUT (0.000000);
RESOLUTION=XGRID(0.000000), YGRID(1.000000),
        SHOWGRID(OFF),SNAPTOGRID(ON);
TERM {
    TERNNAME=HUGE ERROR;
    POINTS=(0.000000, 0.000000)
        (0.642857, 0.000000),
        (1.05000000, 1.000000),
        (1.192857, 1.000000),
        (1.192857, 0.000000),
        (1.200000, 0.000000));
    SHAPE=LINEAR;
    COLOR=RED (0), GREEN (128), BLUE (0);
}
TERM {
    TERMNAME=LOW_ERROR;
    POINTS=(0.000000, 0.000000)
        (0.064286, 0.000000),
        (0.171429, 1.000000),
        (0.285714, 0.000000),
        (1.200000, 0.000000);
    SHAPE=LINEAR;
    COLOR=RED (128), GREEN (0), BLUE (0);
}
TERM {
    TERMNAME=NO_ERROR;
    POINTS=(0.000000, 1.000000),
        (0.021429, 0.000000),
        (1.200000, 1.000000);
    SHAPE=LINEAR;
    COLOR=RED (255), GREEN (0), BLUE (0);
}
TERM {
    TERMNAME=MIN_ERROR;
    POINTS=(0.000000, 0.000000)
        (0.185714, 0.000000),
        (0.350000, 1.000000),
        (0.514286, 0.000000),
        (1.200000, 0.00000);
    SHAPE=LINEAR;
    COLOR=RED (0), GREEN (255), BLUE (0);
}
TERM {
    TERMNAME=MAX ERROR;
    POINTS=(0.000000, 0.000000)
        (0.350000, 0.000000),
        (0.592857, 1.000000),
        (1.200000, 0.000000);
    SHAPE=LINEAR;
    COLOR=RED (0), GREEN (0), BLUE (255);
}
}/*LVAR/*
LVAR {
    NAME=PWM_DELTA;
    BASEVAR=Count_CHANGE;
    LVRANGE=MIN(0.000000) ,MAX(30.000000),
        MINDEF(0),MAXDEF(30),
        DEFAULT_OUTPUT(0.000000);
    RESOLUTION=XGRID(0.000000), YGRID(1.000000),
        SHOWGRID)OFF), SNAPTOGRID(ON);
TERM {
    TERMNAME=HUGE_CHANGE;
    POINTS=(0.000000, 0.000000)
        (14.000000, 0.000000),
        (30.000000, 1.000000);
    SHAPE=LINEAR
    COLOR=RED (0), GREEN (128), BLUE (0);
}
TERM {
    TERMNAME=LOW_CHANGE;
    POINTS=(0.000000, 0.000000),
        (3.000000, 1.000000)
        (9.000000, 0.000000)
        (30.000000, 0.000000));
    SHAPE=LINEAR;
    COLOR=REC (128), GREEN (0), BLUE (0);
}
TERM {
    TERMNAME=NO_CHANGE;
        POINTS=(0.000000, 0.000000),
            (0.000000, 1.000000),
            (4.000000, 0.000000)
            (30.000000, 0.000000)
    SHAPE=LINEAR;
    COLOR=RED (255), GREEN (0), BLUE (0);
}
TERM {
    TERMNAME=MIN_CHANGE;
    POINTS=(0.000000, 0.000000),
        (1.000000, 0.000000),
        (6.000000, 1.000000),
        (10.000000, 0.000000),
        (30.000000, 0.000000);
    SHAPE=LINEAR;
    COLOR=RED (0), GREEN (255), BLUE (0);
}
TERM {
    TERMNAME=MAX_CHANGE;
    POINTS=(0.000000, 0.000000),
        (4.000000, 0.000000),
        (9.000000, 1.000000),
        (19.000000, 0.000000),
        (30.000000, 0.000000):
    SHAPE=LINEAR;
    COLOR=RED (0), GREEN (0), BLUE (255);
}
}/*LVAR*/
}/*VARIABLE_SECTION*/
OBJECT_SECTION {
    INTERFACE {
        INPUT=(DRIVE_ERROR, FCMBF);
        POS=-220, -171;
        RANGECHECK=ON;
    }
    INTERFACE {
        OUTPUT=(PWM_DELTA, COM);
        POS=9, -88;
        RANGECHECK=ON;
    }
    RULEBLOCK {
        INPUT=DRIVE_ERROR;
        OUTPUT=PWM_DELTA;
        AGGREGATION=(MIN_MAX, PAR(0.000000));
        COMPOSITION=(GAMMA, PAR(0.000000));
        POS=-206, -113;
        RULES {
            IF DRIVE_ERROR=NO_ERROR
            THEN PWM_DELTA=NO_CHANGE WITH 1.000;
            IF DRIVE_ERROR=MAX_ERROR
            THEN PWM_DELTA=MAX_CHANGE
            WITH 1.000;
            IF DRIVE_ERROR=HUGH_ERROR
            THEN PWM_DELTA=HUGH_CHANGE
            WITH 1.000;
            IF DRIVE_ERROR=LOW_ERROR
            THEN PWM_DELTA=LOW_CHANGE
            WITH 1.000;
            IF DRIVE_ERROR=MIN_ERROR
            THEN PWM_DELTA=MIN_CHANGE WITH 1.000
        }/*RULES*/
    }
    }/*OBJECT SECTION*/
}/*MODEL*/
}/*PROJECT*/
TERMINAL {
    BAUDRATE=19200;
    STOPBITS= 1;
    PROTOCOL= NO;
    CONNECTION=NOPORT;
    INPUTBUFFER=1024;
    OUTPUTBUFFER=1024;
}/*TERMINAL*/
TERMINAL {
    BAUDRATE= 19200;
    STOPBITS=1;
    PROTOCOL =NO;
    CONNECTION=NOPORT;
    INPUTBUFFER=1024;
```

TABLE 2-continued

```
    OUTPUTBUFFER=1024;
}/*TERMINAL*/
```

The simulator built into the development software allows analysis of the resulting transfer function with simulated error current values applied to the routine. The transfer function is empirically tuned and adjusted by changing the relationship of the various terms in each of the two modules until the desired Drive Delta transfer function is obtained. The Drive Delta fuzzy transfer function is empirically adjusted to reduce ripple current in the lamp. When the desired transfer function has been achieved, the development software compiles the code and generates assembly code for the specific selected controller 210. This code is then stored in the internal memory of the controller 210 and is called as a subroutine by the executive program. The value of the error current value is passed to the routine and the desired PWM Delta counts are provided to the controller to incrementally adjust the duty cycle of the PWM control signal, thereby controlling the lamp current and reducing the error current value, as further described below.

The procedure outlined above can be completed for different lamp types and lamp wattages to generate assembly code instructions for a plurality of lamp types and wattages to be stored in the memory of the controller 210. The desired fuzzy code for a specific lamp wattage and type stored in the internal memory of the controller 210 can be selected with the lamp selector mechanism 354 and recalled for use by the controller 210. Thus, a single controller can be used to control the operation of a plurality of lamp wattages and lamp types. The number of lamp wattage and types stored in a single controller is determined by available memory to store (i) the lamp specific assembly code, less than 100 bytes per lamp for the selected fuzzy software development system, (ii) the library routines used to determine the actual fuzzy transfer functions, less than 1200 bytes, from the lamp specific assembly code.

The ability of fuzzy logic to control systems in a non-linear manner makes it possible to use the same power supply components and the same fuzzy logic controller to operate a range of lamp wattages of a selected lamp type. For example, a single fuzzy logic electronic ballast 22 can include components with operating ranges that can operate a range of wattages of direct current metal halide lamps including 30 W, 50 W, 100 W and 150 W. The components in the power supply portion of the ballast can be under driven for the lower wattage lamps or over driven for the higher wattage lamps. Typically, when power supply components are over or under driven they operate in non-linear ranges. One skilled in the art will appreciate that fuzzy logic control systems have been shown to be capable of effectively and precisely controlling systems in non-linear portions of their operating ranges. Similarly, the fuzzy logic control system of the present invention permits the use of a single ballast with components having advantageously sufficient operating ranges to be used in combination with a fuzzy logic controller having a fuzzy control routine for each of a plurality of lamp wattages and lamp types. The specific selected lamp wattage and type designates the appropriate fuzzy routines to be loaded from memory in the controller to be used in the control process of the present invention. Thus, a single controller can have the assembly code to control as many lamp types and lamp wattages as available memory permits. In addition, since precision control of the ballast in over drive and under drive conditions is possible, the fuzzy logic controller of the present invention reduces the number of ballasts required to operate different wattage lamps of a specific lamp type.

Furthermore, system components can operate in non-linear ranges when (i) components degrade over usage or time, (ii) components begin to fail, (iii) wider tolerance components are used to reduce manufacturing costs. The fuzzy logic control system of the present invention maintains precision control in the non-linear operating ranges for components in the above listed conditions.

Figure 3:
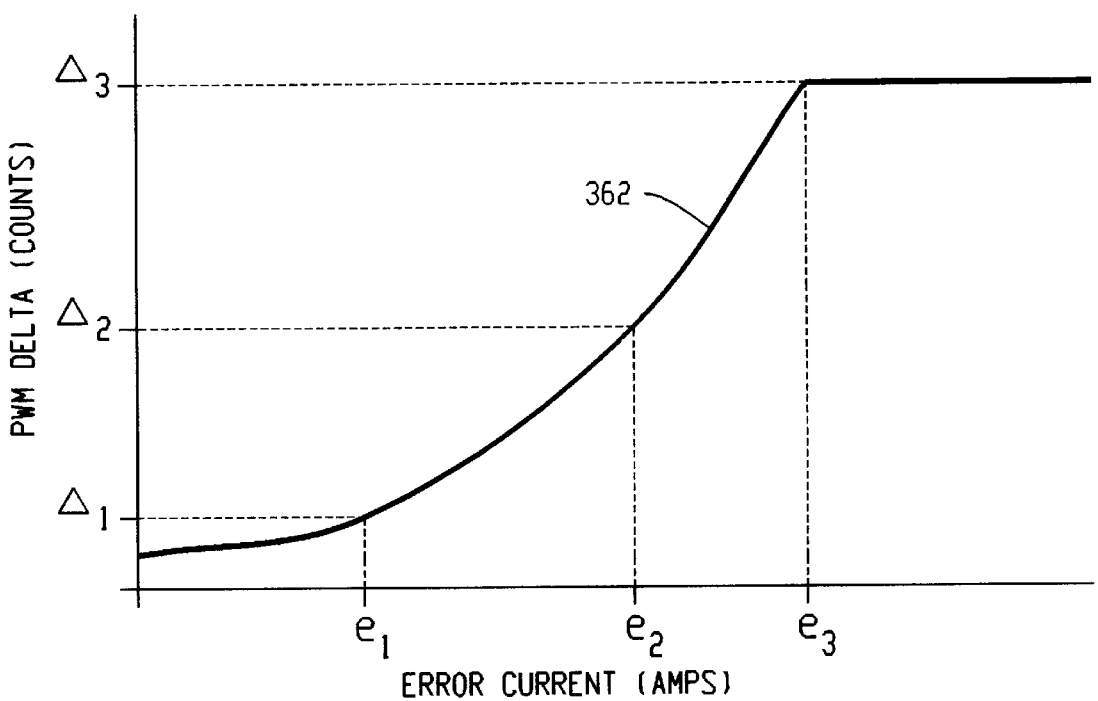
FIG. 3 is a graph of a transfer function of the count changes in Pulse Width Modulation duty cycle as a function of error current.

Once the error current value is determined, the duty cycle of the PWM control signal provided at the output 230 is advantageously adjusted incrementally by the controller 210 to reduce the difference between the signal value indicative of the sensed lamp current and the desired lamp current in increments in accordance with a drive delta transfer function 362 shown in FIG. 3. The drive delta transfer function 362 is developed using the fuzzy logic development software package described above. The specific input variables and development for the fuzzy setpoint transfer function 360 in FIG. 2 and the drive delta transfer function in FIG. 3 is described in detail below.

The resistor 296 aids in discharging the capacitor 294 so that the capacitor 294 can provide a voltage signal indicative of the actual current flowing through the lamp 24 after each pulse. This reduces the amount of time required for the controller 210 to correct for deviations in the signal indicative of sensed lamp current and the desired value of lamp current. Since the op amps 272, 282 are single supply op amps, the diode 260 lifts the voltage values provided to the inputs 270, 276 to a voltage level that is more easily detected by the op amp 272.

Figure 4A:
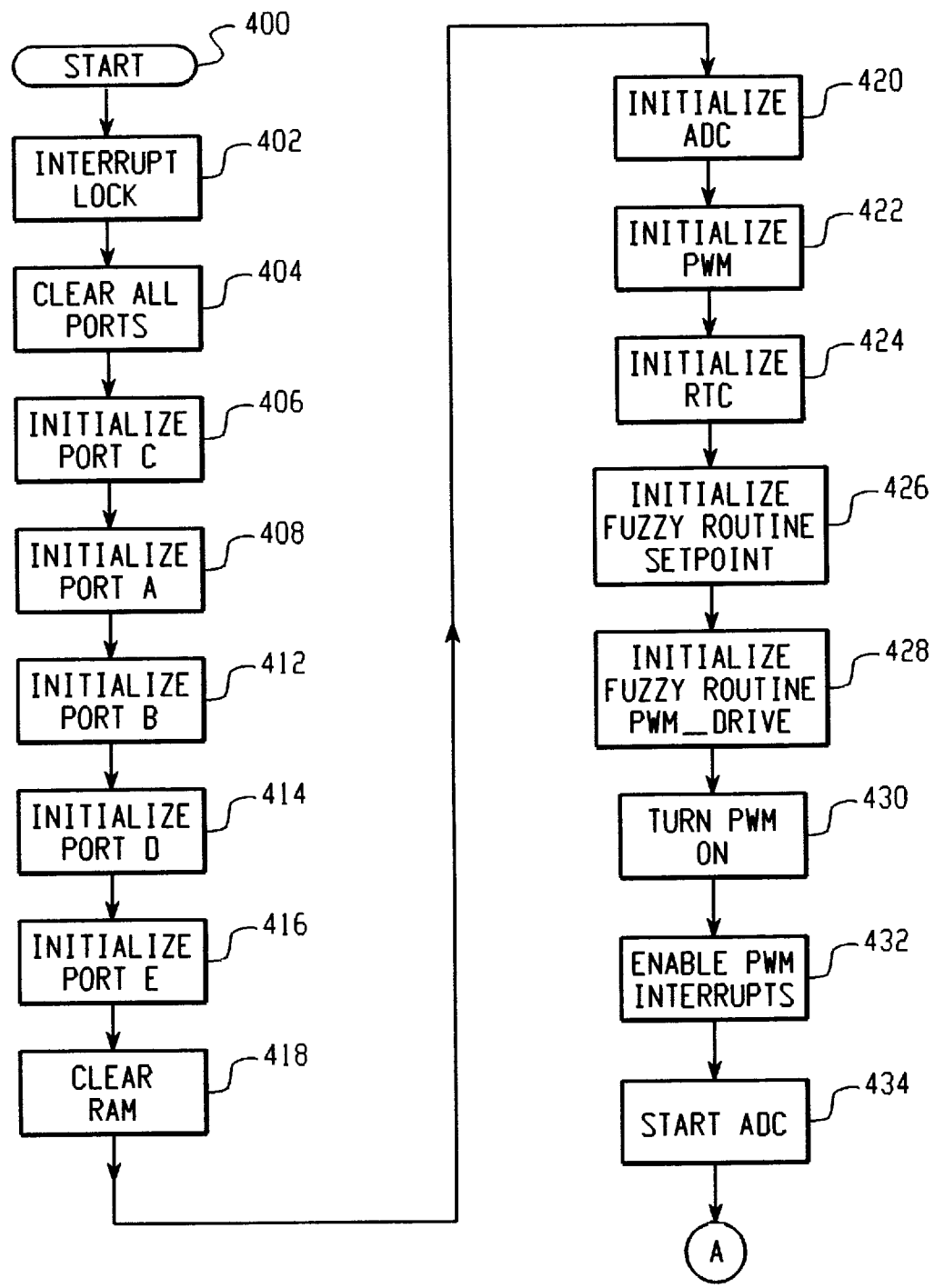
FIG. 4A and 4B illustrates a flow diagram showing the control process of the system of the present invention.
Figure 4B:
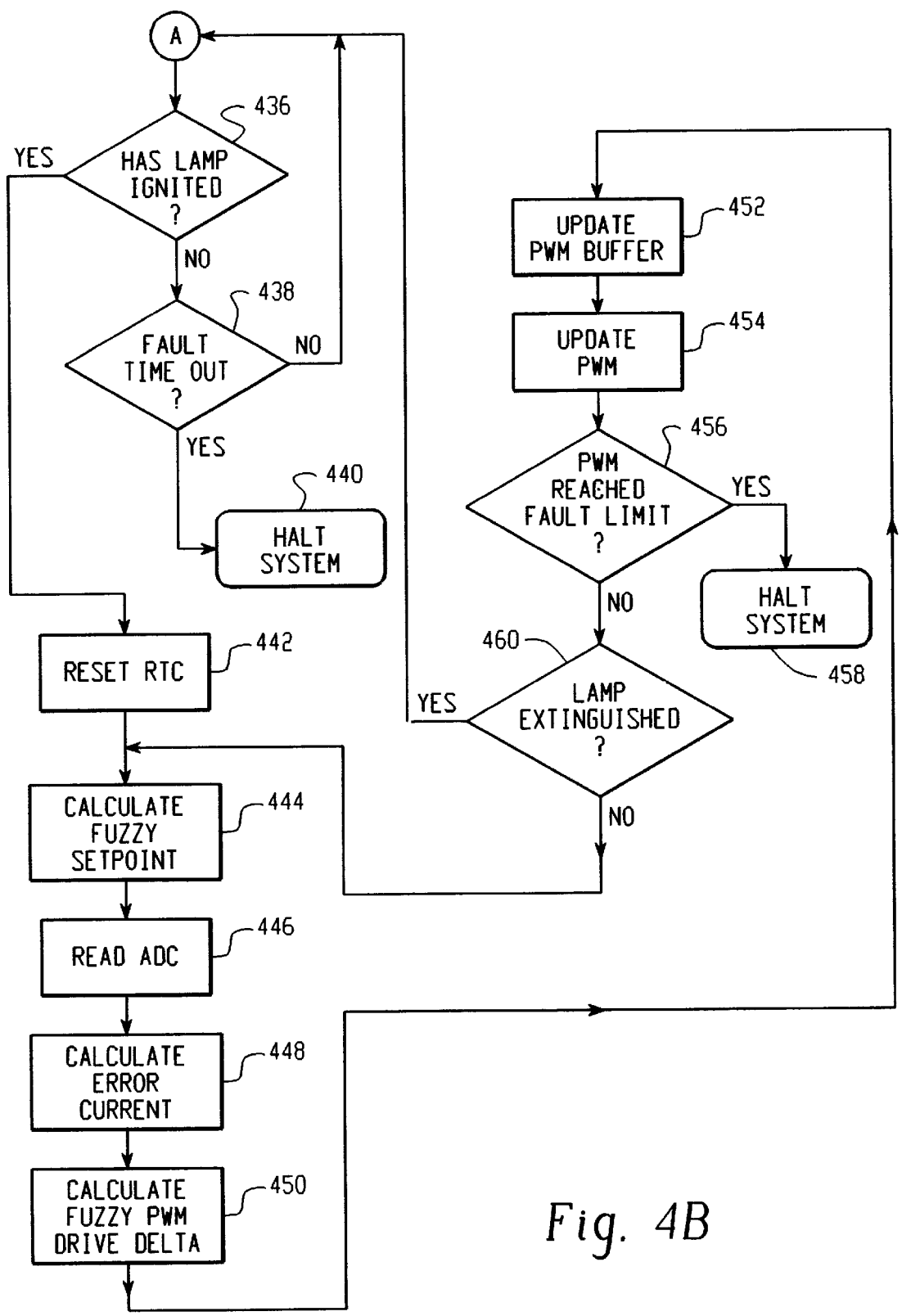
Figure 5:
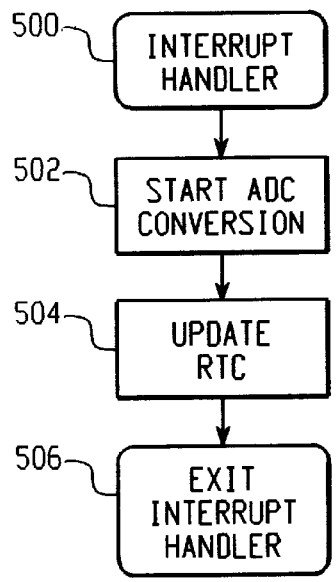
FIG. 5 is a flow diagram of an interrupt routine used in the control process shown in FIGS. 4A and 4B of the system of the present invention.

Referring now to FIGS. 4A, 4B and 5, the control process of the controller 210 of the present invention will be appreciated. The process starts in step 400 each time power is applied by the electrical source 26 to the electronic ballast 22 to turn the lamp 24 on. The AC/DC converter 164 generated the MCLR signal which is provided to the input 208 of the controller 210, thereby resetting the controller 210. The controller begins executing the software code from the beginning. Depressing the manual reset switch 206 also resets the controller 210 with the same effect.

Next, in step 402, an interrupt lockout is implemented to insure that spurious interrupts are not generated from indeterminate states of the PWM control signal or other electrical disturbances that can cause the controller 210 to halt or not initialize. The interrupts, occurring on the negative edge of the PWM control signal provided to interrupt input 236, are disabled until the initialization routines described below are completed.

In step 404, the data registers for all the ports are cleared. The controller 210 has ports A, B, C, D, and E that each include a plurality of bidirectional pins for input or output to the controller 210 as configured during the initialization procedures. The process then proceeds to step 406 where port C is initialized. The bidirectional pins of port C are set to operate as outputs. Specifically, the output 230 provides the PWM control signal to the logic driver 232 to control switching of the transistor 252. Other pins (not shown for clarity of illustration) can provide serial communication between the controller 210 and other external systems and devices. For example, the controller 210 can be in data communication with a building control or energy management system, an optical or wireless transmitter, a power factor correction controller, and a DC/AC inverter to provide for the operation of alternating current lamps.

In step 408, port A is initialized. In a preferred embodiment (shown in FIG. 1) one pin is set as the input 302 for receiving the signal indicative of lamp current. The other pins (not shown for clarity of illustration) in the port A are set as outputs. One skilled in the art can appreciate that these pins can be set a inputs to allow for measurement of lamp voltage, and hence operate the lamp based on power rather than current, sense voltages for power factor correction, or automatic detection of line voltages present at the inputs 26 for more universal operation.

Next, in step 412 port B is initialized. A bidirectional pin is set as the input 236 for receiving the PWM command signal such that the trailing edge of the PWM command signal from PWM output 230 causes an interrupt in the controller 210. The remaining pins (not shown) are set as outputs and some pins are used for testing purposes. In step 414, port D is initialized. The bidirectional pins are set as outputs and are used for testing purposes. The process continues to step 416 where port E is initialized. The bidirectional pins are set as inputs to receive signals from the lamp select mechanism 354 for selecting specific algorithms to control a desired (i) lamp type, e.g. mercury, metal halide, high pressure sodium, and low pressure sodium, and (ii) lamp wattage from the typical available wattage for a selected lamp type.

In step 418, all onboard RAM locations of the controller 210 are cleared and set to zero. Next, in step 420, the internal Analog-to Digital converter (not shown for clarity of illustration) of the controller 210 is initialized. The A/D converter is preferably set for the fastest conversion rate, using $V_{cc}$ as the reference, and the A/D conversion enable is set to OFF. In step 422, the Pulse Width Modulator ("PWM")internal to the controller 210 is initially configured to operate at a frequency of 44.3 kHz and at a duty cycle of 20% to 40%, preferably at a duty cycle of 35%. The initial value for the PWM duty cycle is stored in a PWM buffer (not shown for clarity of illustration) internal to the controller 210. The initial configuration of frequency and duty cycle of the PWM control signal is selected based upon duty cycle resolution of the microprocessor selected for use as the controller 210. Insufficient duty cycle resolution results in higher ripple current in the lamp 24. Additional factors that affect the selection of the initial frequency and initial duty cycle are lamp control parameters for effective operation, design of the ballast power conversion components, and the desired current limit at lamp ignition. The process continues to step 424 where the Real Time Clock (RTC) internal to the controller 210 is initialized. The update rate for the RTC is set at 2 Hz, depending upon the availability of internal registers of the controller 210, requirements of the fuzzy control algorithms, and the operating requirements of the lamp.

In step 426, the pointers are established and the registers used by the SETPOINT fuzzy routine are initialized. The SETPOINT fuzzy routine is developed using the fuzzy logic development software package described above.

Next, in step 428, the fuzzy routine PWM_DRIVE is initialized. The software jump pointers are established and the registers used by the PWM_DRIVE fuzzy routine are initialized.

The process continues to step 430 where the PWM is turned ON and the controller 210 begins outputting the PWM control signal on the PWM output 230.

In step 432, the PWM interrupts are enabled by insuring that the external interrupt status is clear and the external interrupts are enabled. Next, in step 434, the analog-to-digital converter is turned ON, thereby allowing the digital conversion of the voltage sensed on the port A input channel selected in step 408 above. In a preferred embodiment, the input 302 receives the sensed voltage to be digitized for use by the controller 210.

In step 436, a determination is made as to whether the lamp 24 has ignited. The values of a number of digitized ADC values in a series of values produced from measurements received on input 230 are evaluated to determine if the lamp has ignited. When at least a majority of the measurements in the series of values are above a predetermined threshold, the lamp 24 is considered to have ignited. The lamp ignition determination in step 436 prevents full scale readings produced from system noise or from the high voltage ignition pulse from causing the controller 210 to reduce the PWM duty cycle of the PWM control signal to a level that prevents the lamp 24 from passing through the glow to arc starting transition. If the determination in step 436 is negative, an indication that the lamp has not ignited, the process continues to step 438.

In step 438, a determination is made as to whether a fault time out has occurred. If the lamp 24 has not ignited after a predetermined period of time, a time out fault is considered to have occurred. When the time out fault occurs, the determination in step 438 is affirmative and the process continues to step 440. In step 440 the PWM is turned OFF causing the high voltage lamp ignition transformer 138 to stop pulsing. The controller 210 is set to an idle condition. The system 20 is restarted via a power up reset or a manual reset using the switch 206. If the determination in step 438 is negative, indicating that even though the lamp 24 has not ignited a time out fault has not occurred, the process returns to step 436 where the controller 210 continues to attempt lamp ignition.

If the determination in step 436 is affirmative, indicating that the lamp 24 has ignited, the process continues to step 442. In step 442, the Real Time Clock ("RTC") is reset to begin timing lamp operation from lamp ignition rather than the time that lamp ignition was first attempted, i.e. at system start up.

Next, in step 444, the fuzzy setpoint value is calculated based upon the membership function and the selected lamp. The value of the Real Time Clock is fetched and the fuzzy SETPOINT routine calculates the desired lamp current for the moment in time represented by the RTC value according to the fuzzy setpoint transfer function 360 in FIG. 2. The SETPOINT routine provides a continuous function evaluated in real time.

Referring to FIG. 2, the fuzzy setpoint transfer function 360 shows the desired current levels per unit of time for a selected HID lamp type and wattage during the three typical modes of operation and controlled by the system of the present invention. The desired ignition start up lamp current is $i_3$ amps during the time period $t=0$ to $t=t_1$. During the time period $t=t_1$ to $t=t_2$, the desired lamp current is decreased at a controlled rate. The controlled rate of decrease in lamp current i, is to avoid accidental shut off of the lamp as the current level decreases to the next desired level $i_2$. The lamp warm up current continues at $i_2$ during the time period $t=t_2$ to $t=t_3$. At the time $t_3$, the lamp current is decreased at a controlled rate to the steady state operating current $i_1$ at $t=t_4$. It will be appreciated that while the desired lamp current values are calculated in real time in this embodiment, given sufficient memory available to the controller 210, a look-up table stored in the memory of the controller 210 may be used to store the fuzzy setpoint values with respect to RTC values.

The process then proceeds to step 446.

In step 446, the controller 210 reads the most recent digital voltage value provided by the A/D converter. The most recent digital voltage value is averaged with previous voltage values. Preferably, a running arithmetic average is used to average the digitized voltage values. The running arithmetic average reduces the effect of random measurement variations and noise, thereby adding more stability to the control of the lamp system. Other averaging methods could be used, however, next, in step 448, the error current value is determined between the average lamp current determined in step 446 and the desired lamp current determined in step 444. Both positive and negative error current values are determined as well as the absolute value of the error current values.

In step 450, the fuzzy PWM Drive Delta is determined. Using the absolute value of the error current value, determined in step 448, the magnitude of incremental count change to the duty cycle of the PWM control signal is determined by the PWM_DRIVE fuzzy routine. The incremental count changes for the error current value are calculated in real time in accordance with the Drive Delta transfer function 362 shown in FIG. 3. The shape of the Drive Delta transfer function, i.e. the change in PWM counts as a function of error current, is dependent upon the resolution of the Analog-to-Digital converter internal to the controller 210, the desired control loop lock rate, lamp ripple current, and accuracy of the controlled lamp's current.

Referring to FIG. 3, the Drive Delta fuzzy transfer function 362 plots the count change versus the magnitude of the error current. When the error current is at a magnitude of $e_1$ amps, the incremental count change to the duty cycle of the PWM control signal is $\Delta_1$ counts. When the magnitude of the error current is larger, as shown at $e_2$ amps, the incremental count change to the duty cycle of the PWM control signal is $\Delta_2$ counts. When the magnitude of the error current reaches a level $e_3$ amps, the incremental count change to the duty cycle of the PWM control signal is $\Delta_3$ counts. Error current values having a magnitude greater than $e_3$ amps result in the incremental count change in PWM duty cycle being adjusted by $\Delta_3$ counts, the maximum count change in duty cycle count. In the present example, the maximum count change is 30 counts. The process then proceeds to step 452.

In step 452, the present value of the PWM duty cycle stored in the PWM buffer is updated. Depending on the algebraic sign of the error current value determined in step 448, the incremental change to the PWM duty cycle determined in step 450 is suitably added or subtracted from the PWM duty cycle value currently stored in the PWM buffer to reduce the error current value. The new PWM duty cycle value replaces the old value in the PWM buffer.

In step 454, the new PWM duty cycle value in the PWM buffer is transferred to the PWM registers used to control the PWM output signal on the output 230. The new PWM duty cycle is changed on the next CPU clock after the transfer of the PWM duty cycle value from the PWM buffer to the PWM registers. The process continues to step 456.

In step 456, a determination is made as to whether a fault has occurred in the lamp. A fault is considered to occur when the lamp circuit develops an over current condition as indicated by the signal provided to the input 302 and the PWM duty cycle cannot be regulated to a lower PWM duty cycle. Specifically, when the sensed current exceeds the commanded current value, the PWM drive delta incrementally decreases the PWM control signal. When the sensed current value does not decrease in response to the incremental adjustments in the duty cycle of the PWM control signal, the controller 210 continues to incrementally decrease the duty cycle of the PWM control signal. Eventually, the duty cycle of the PWM control signal cannot be further reduced to regulate the lamp operation. Therefore, a first predetermined PWM duty cycle fault limit is suitably selected to correspond to a lower PWM duty cycle limit. The duty cycle of the PWM control signal is compared in the controller 210 with the first PWM duty cycle limit. When the duty cycle of the PWM command signal is less than the first PWM duty cycle limit, a fault is considered to have occurred. The first PWM duty cycle limit is based on the lamp operating characteristics, such as current levels considered to be an over current condition, and other circuit parameters. When the determination in step 456 is affirmative, indicating that the PWM duty cycle is less than the first PWM duty cycle limit and a fault is considered to have occurred, the process proceeds to step 458 where the system is halted. The Pulse Width Modulation in the controller 210 is turned OFF and the controller 210 is idle. The system can be restarted using the manual reset or with a power start up. If the determination in step 456 is negative, indicating that the PWM control signal is greater than the first PWM duty cycle limit and that a fault condition does not exist, the process proceeds to step 460.

In step 460, a determination is made as to whether the lamp has extinguished. If voltage sensed across the resistor 256 provided to the input 302 is not increasing in response to increasing PWM duty cycle, the controller 210 continues to incrementally adjust the duty cycle of the PWM control signal to increase the current flow in the lamp 24. The internal A/D converter provides the voltage value that is not responding to the incremental duty cycle adjustments. As described in step 446, the voltage value from input 302 is averaged with the previous digital values to determine the error current value. As the error current value continues to increase the PWM duty cycle in the buffer is suitably adjusted by the PWM Drive Delta. Therefore, since the sensed current flow is not responding to the increased duty cycle of the PWM control signal, the duty cycle of the PWM control signal continues to increase. As the duty cycle of the PWM control signal increases, the voltage applied to the lamp increases as the transformer 138 is energized. At 100% duty cycle the voltage at the lamp can reach 300 Vdc, in the present example. A second predetermined PWM duty cycle limit is compared in the controller 210 with the PWM duty cycle of the PWM control signal to determine whether the lamp has extinguished and the controller 210 is continuing to try to drive the extinguished lamp by adjusting the PWM duty cycle. The second predetermined PWM duty cycle limit is advantageously selected to correspond to a duty cycle that produces a voltage at the lamp that is less than the voltage used to generate the ignition arc. If the PWM duty cycle exceeds the second predetermined threshold PWM duty cycle, the determination in step 460 is affirmative and the process returns to step 436, where the lamp is restarted. If the determination in step 460 is negative, indicating that the PWM duty cycle has not exceeded the second predetermined PWM duty cycle threshold and that the lamp 24 is operating normally, the process returns to step 444.

Referring now to FIG. 5, the interrupt routine of the controller 210 of the present invention will be appreciated. In step 500, the interrupt handler is entered at the termination of each PWM pulse, i.e. a negative edge external interrupt. Next, in step 502, the controller 210 initiates an analog-to digital conversion of the voltage provided at the input 302. The digitized voltage value is provided to the control process in step 446 as described above. In step 504 the Real Time Clock (RTC) is updated by one count for use in determining the setpoint value described above in step 444. In step 506 the interrupt routine is exited and the controller 210 resumes processing the software program as is known in the art.

Referring to FIG. 6, another embodiment using a different circuit for detecting the peak current flowing through the lamp of the present invention is shown. Similar elements in both embodiments are similarly numbered. A first terminal 310 of a transformer 314 is connected to the junction 131. The transformer 314 has a first coil 312 connected to the first terminal 310 and a second terminal 316. The transformer 314 has a second coil 318. The second coil 318 has one end connected a terminal 320 and the other end connected to a second terminal 322. The second terminal 322 is connected to electrical ground. The transformer 314 is used as an inductor in the present invention. The second terminal 316 of the coil 312 is electrically connected to the drain of the transistor 252. The source of the transistor 252 is connected to electrical ground.

A diode 324 has its anode connected to the terminal 320 of the transformer 314. The cathode of the diode 324 is connected to one end of a resistor 326. The other end of the resistor 326 is connected to a junction 328. A resistor 330 has one end connected to the junction 328. The other end of the resistor 330 is connected to a junction 332. A capacitor 334 and a resistor 336 are parallel connected between the junction 332 and electrical ground. The junction 332 is electrically connected to an input 350 in port "A" of the controller 210.

A transient suppressor has one end connected to the junction 328. The other end of the suppressor 340 is connected to electrical ground. The transient suppressor 340 is advantageously connected to protect the controller 210 by eliminating transients that pass across the transformer 314 during lamp ignition. A resistor 342 has one end connected to the junction 328 and another end connected to a junction 344. A capacitor 346 and a resistor 348 are parallel connected between the junction 344 and electrical ground. The junction 344 is electrically connected to an input 338 in port "A" of the controller 210. Two pins in port "A" are set as the inputs 338, 350 for receiving signals indicative of the current in the lamp 24. The remaining pins in port A are set as outputs. It will be appreciated that all three inputs 302 in the preferred embodiment, and the inputs 338, 350 may be set as inputs and the remaining pins set as outputs regardless of the embodiment selected and that the software programming internal to the controller 210 will advantageously process the appropriate signal received at the inputs in port A as required.

During operation, the resistors 330, 336 and the capacitor 334 form an integrator circuit. The resistors 342, 348 and the capacitor 346 form an integrator circuit. When constant current is passed through the transformer 314, a step voltage appears on the second coil 318 of the transformer 314. This voltage is integrated over time by the resistor and capacitor combinations described above. The peak voltage values of the integrated voltage signal, a ramp, appears on the capacitors 334, 346. The peak voltage values stored on the capacitors 334, 346 is representative of the peak energy stored in the transformer 314. These voltage values are indicative of the current level flowing through the lamp 24 just as the voltage value across the resistor 256 in the preferred embodiment.

The resistor/capacitor ratios for the resistors 342, 348 and the capacitor 346 are suitably selected to normalize the voltage value across the capacitor 346 for optimal A/D conversion during high lamp current periods such as lamp start up. The resistor/capacitor ratios for the resistors 326, 330, 336 and the capacitor 334 are advantageously selected to normalize the voltage value across the capacitor 334 for optimal A/D conversion during low lamp current periods such as lamp dimming and normal operation. The resistor 348 provides a discharge path for the capacitor 346 and the resistor 336 provides a discharge path for the capacitor 334. The capacitor discharge paths through the resistors 336, 348 allows the capacitors 334, 346 to reflect variations in peak voltage values, that represent peak lamp currents, to be detected on each charge cycle without an averaging effect.

The controller 210 receives the voltage inputs from the input 338 or 350 and provides the appropriate voltage value for A/D conversion such that the digitized voltage value is used in the control process described above in FIGS. 4A, 4B, and 5.

The fuzzy logic ballast of the present invention optimizes the warm up period of the lamp by applying a higher and precisely controlled current level during lamp operation. The warm up period can be reduced by 50% depending on lamp type and wattage to 5–10 minuets instead of 10–20 minuets using conventional control method and electronic ballasts. The precisely controlled current levels maximize electrode life and minimize current ripple in the lamp while optimizing the warm up process. The fuzzy logic control of the present invention also provides control of the ballast power supply in non-linear operating ranges. The non-linear control capabilities of the fuzzy logic controller allow (i) a single design of ballast components to be used for a plurality of lamp wattages of a specified lamp type, (ii) for precision lamp control when components are degrading or failing, and (iii) wider tolerance components are used to reduce manufacturing costs.

It is to be understood that even though the present invention is described with both transfer functions being fuzzy logic transfer functions it is contemplated that a single fuzzy logic transfer function may be used alone or in combination with a conventional control technique, i.e. conventional feedback, open-loop, etc.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An apparatus for controlling a high intensity discharge lamp, said apparatus comprising:

generating means adapted for generating a fuzzy logic transfer function for controlling the operation of an associated lamp;

sensing means for sensing a lamp current and providing a signal indicative of lamp current;

timing means for measuring lamp operation time, including means for generating a real time signal indicative thereof; and control means adapted for applying the fuzzy logic transfer function to control the operation of the associated lamp, the control means including means adapted for providing a control signal in response to both of the signal from the sensing means and the signal from the timing means in accordance with the fuzzy logic transfer function.

2. The apparatus for controlling a high intensity discharge lamp of claim 1 wherein the means for generating fuzzy logic transfer functions includes means for generating a first fuzzy logic transfer function including a lamp ignition membership function and a lamp steady state membership function.

3. The apparatus for controlling a high intensity discharge lamp of claim 2 wherein the lamp ignition membership function and the steady state membership function are functionally related to both of the real time and the lamp current.

4. The apparatus for controlling a high intensity discharge lamp of claim 3 wherein the first fuzzy logic transfer function further includes a lamp warm up membership function functionally related to both of real time and the lamp current.

5. The apparatus for controlling a high intensity discharge lamp of claim 1 wherein the control means further includes determining means for determining a lamp error current value.

6. The apparatus for controlling a high intensity discharge lamp of claim 5 wherein the means for generating the fuzzy logic transfer functions includes means for generating a second fuzzy logic transfer function that includes a first current error magnitude membership function and a second different current error magnitude membership function, wherein the first and second membership functions are functionally related to both of the error current value and a pulse width modulator count change value.

7. The apparatus for controlling a high intensity discharge lamp of claim 1 further including lamp selector means operatively connected to the controller for selecting a specific fuzzy transfer function to be applied by the controller from a plurality of fuzzy transfer functions stored in a memory of the controller.

8. The apparatus for controlling a high intensity discharge lamp of claim 1 wherein the control means for applying the fuzzy logic transfer function includes a look-up table.

9. The apparatus for controlling a high intensity discharge lamp of claim 1 further including switching means controllably connected to the control means, the switching means being adapted for supplying electrical current to the associated lamp in response to the control signal.

10. The apparatus for controlling a high intensity discharge lamp of claim 5 wherein the means for determining the lamp error current value includes means for comparing the signal indicative of the sensed current to the first fuzzy logic transfer function and means for providing the control signal in response to the comparison.

11. An apparatus for controlling a high intensity discharge lamp, said apparatus comprising:

generating means adapted for generating fuzzy logic transfer functions for controlling the operation of an associated lamp, the generating means including means for generating a first fuzzy logic transfer function that includes both of a lamp ignition membership function and a lamp steady state membership function, the generating means further including means for generating a second fuzzy logic transfer function including a first current error magnitude membership function and a second different current error magnitude membership function, the first and second membership functions being functionally related to the error current value and a PWM count change value;

sensing means for sensing a lamp current and providing a signal indicative of lamp current;

timing means for measuring operating time of the associated lamp, including means for generating a real-time signal indicative thereof; and control means adapted for applying the first and second fuzzy logic transfer functions to control the operation of the associated lamp, the control means including means adapted for providing a control signal in response to both of the signal from the sensing means and the signal from the timing means in accordance with the first and second fuzzy logic transfer functions.

12. The apparatus for controlling a high intensity discharge lamp of claim 11 further including lamp selector means operatively connected to the controller for selecting a fuzzy transfer function, from a plurality of fuzzy transfer functions stored in a memory of the controller, to be applied by the controller.

13. The apparatus for controlling a high intensity discharge lamp of claim 11 wherein the fuzzy logic transfer functions are stored in a look-up table.

14. A method for controlling a high intensity discharge lamp, said method comprising the steps of:

generating at least one fuzzy logic transfer function for controlling the operation of an associated lamp;

sensing a lamp current and providing a signal indicative of lamp current;

measuring operating time of the associated lamp;

generating a real-time signal representative of the operating time of the associated lamp; and applying the fuzzy logic transfer function to control operation of the lamp pursuant to a control signal responsive to the sensed lamp current signal and the real time signal.

15. The method for controlling a high intensity discharge lamp of claim 14 wherein the step of generating at least one fuzzy logic transfer function includes a step of deriving a lamp ignition membership function and a lamp steady state membership function.

16. The method for controlling a high intensity discharge lamp of claim 15 wherein the step of generating at least one fuzzy logic transfer function further includes a step of developing a lamp warm up membership function functionally related to the real time signal and the signal indicative of lamp current.

17. The method for controlling a high intensity discharge lamp of claim 14 further including the step of selectively applying a fuzzy transfer function to the controller from a plurality of fuzzy transfer functions stored in a memory of the controller.

18. The method for controlling a high intensity discharge lamp of claim 14 wherein the step of selectively applying the fuzzy logic transfer function further includes the step of determining a lamp error current value.

19. The method for controlling a high intensity discharge lamp of claim 18 wherein the step of generating at least one fuzzy logic transfer function includes a step of generating a second fuzzy logic transfer function including a first current error membership function and a second different current error membership function, first and second current error membership functions being functionally related to the error current value and a Pulse Width Modulator count change value.

20. The method for controlling a high intensity discharge lamp of claim 14 wherein the step of applying the fuzzy logic transfer function includes the step of using a look-up table.

21. The method for controlling a high intensity discharge lamp of claim 18 wherein the step of determining the lamp error current value further includes the steps of:

comparing the signal indicative of the sensed current to the first fuzzy logic transfer function; and generating the control signal in response to the comparison.

22. An apparatus for controlling a high intensity discharge lamp, said apparatus comprising:

storing means for storing a fuzzy logic transfer function for controlling the operation of an associated lamp;

sensing means for sensing a lamp current and providing a signal indicative of lamp current:

timing means for measuring operating time of the associated lamp including means for generating a real time, signal indicative thereof:

control means adapted for applying the fuzzy logic transfer function to control the operation of the associated lamp, the control means including means adapted for selectively providing a control signal in accordance with the fuzz logic transfer function.

23. The apparatus for controlling a high intensity discharge lamp of claim 22 wherein the fuzzy logic transfer function is stored in a look-up table.

24. An apparatus for controlling a high intensity discharge lamp, said apparatus comprising:

storing means for storing a fuzzy logic transfer function for controlling the operation of an associated lamp;

sensing means for sensing a lamp current and providing a signal indicative of a lamp current value;

comparing means for comparing the sensed current value with a desired lamp current value and providing an error signal value indicative of the comparison; and control means adapted for applying the fuzzy logic transfer function to control the operation of the associated lamp, the control means providing a control signal in response to the error signal in accordance with the fuzzy logic transfer function.

25. The apparatus for controlling a high intensity discharge lamp of claim 24 wherein the fuzzy logic function is stored in a look-up table.

26. A method for controlling a high intensity discharge lamp, said method comprising the steps of:

storing a fuzzy logic transfer function in a memory of a controller;

applying the fuzzy logic transfer function;

sensing a lamp current and providing a signal indicative of the lamp current;

measuring operating time of an associated lamp; and providing a control signal to control the operation of the associated lamp according to the fuzzy logic transfer function.

27. An apparatus for controlling a high intensity discharge lamp, said apparatus comprising:

storing means for storing a fuzzy logic transfer function for controlling the operation of an associated lamp;

sensing means for sensing a lamp current and providing a signal indicative of a lamp current value;

comparing means for comparing the sensed lamp current value with a desired lamp current value and providing an error signal value indicative of the comparison; and control means adapted for applying the fuzzy logic transfer function to control the operation of the associated lamp, the control means including means adapted for selectively providing a control signal in response to the error signal in accordance with the fuzzy logic transfer function.

28. A method for controlling a high intensity discharge lamp, said method comprising the steps of:

storing a fuzzy logic transfer function in a memory of a controller;

applying the fuzzy logic transfer function;

sensing a lamp current and providing a signal indicative of the lamp current value;

comparing the sensed lamp current value and providing an error signal value indicative of the comparison; and providing a control signal in response to the error signal value in accordance with the fuzzy logic transfer function.

* * * * *

UNITED STATES PATENT AND TRADEMARK OFFICE
CERTIFICATE OF CORRECTION

PATENT NO. : 5,806,055

DATED : September 8, 1998

INVENTOR(S) : Kenneth L. Zinda, Jr.

Figure 1B:
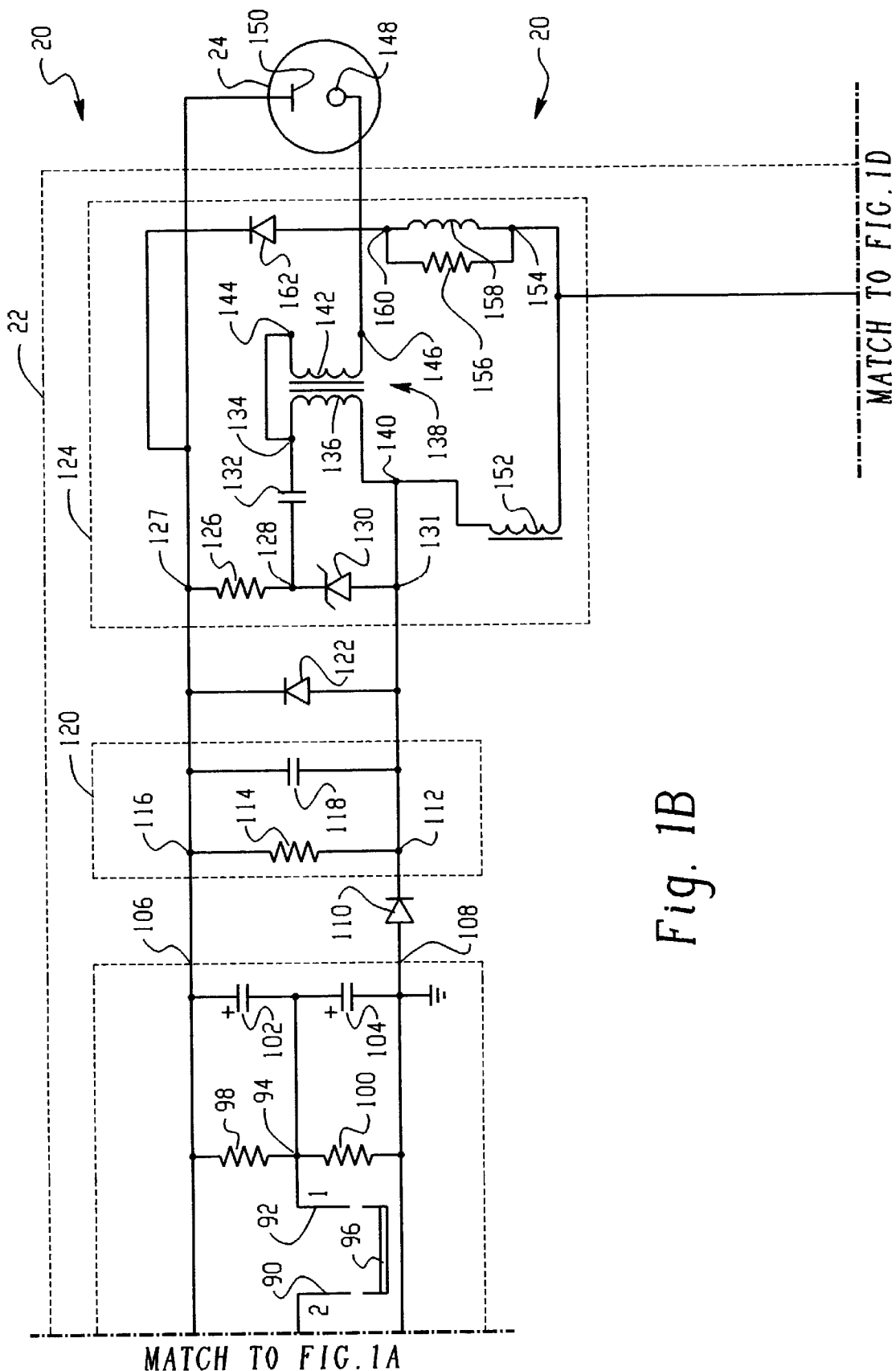
Figure 1D:
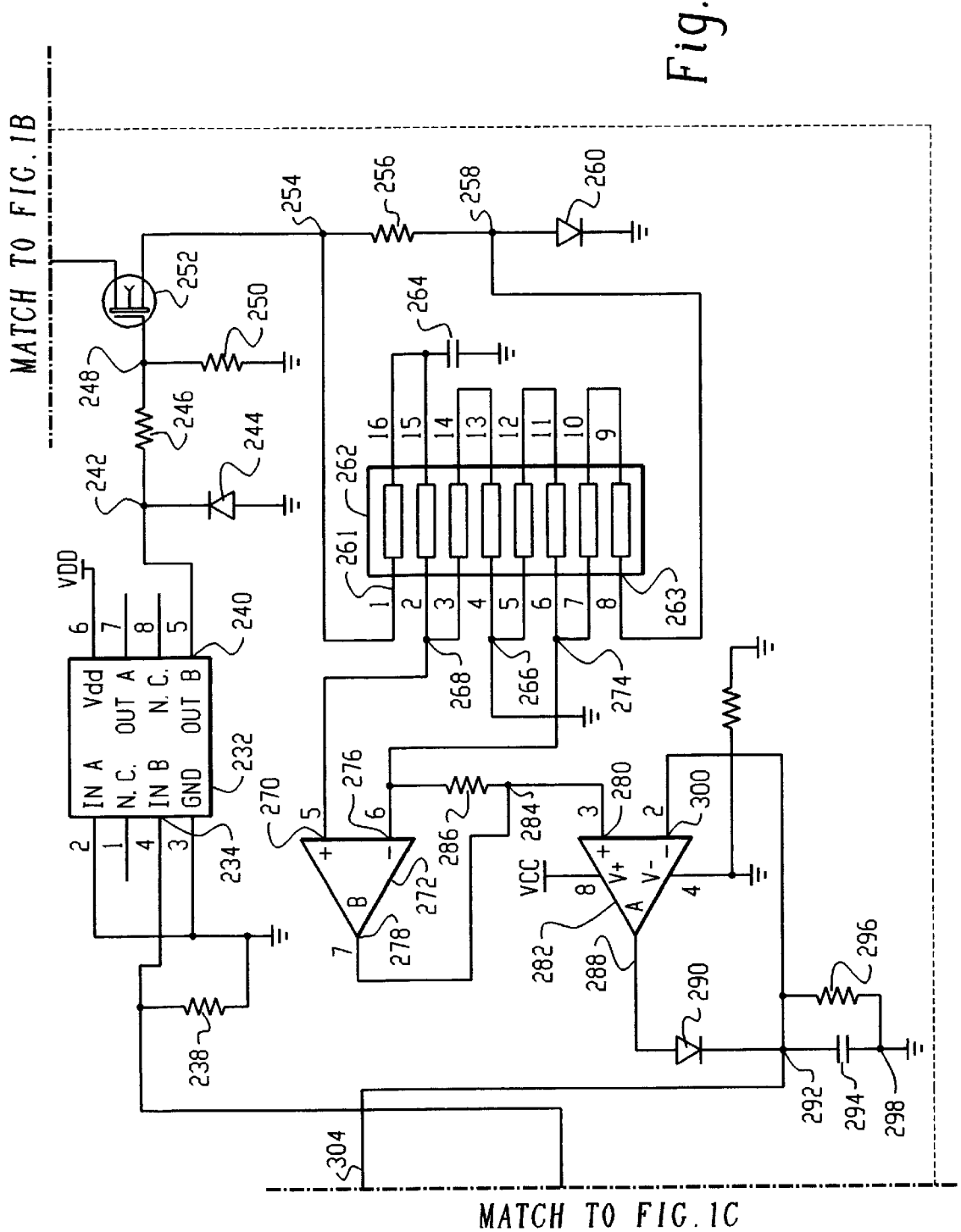

It is certified that error appears in the above-identified patent and that said Letters Patent is hereby corrected as shown below:

Column 2, line 4, change "FIG. 1 is" to --FIGS. 1A to 1D are--.

Figure 6B:
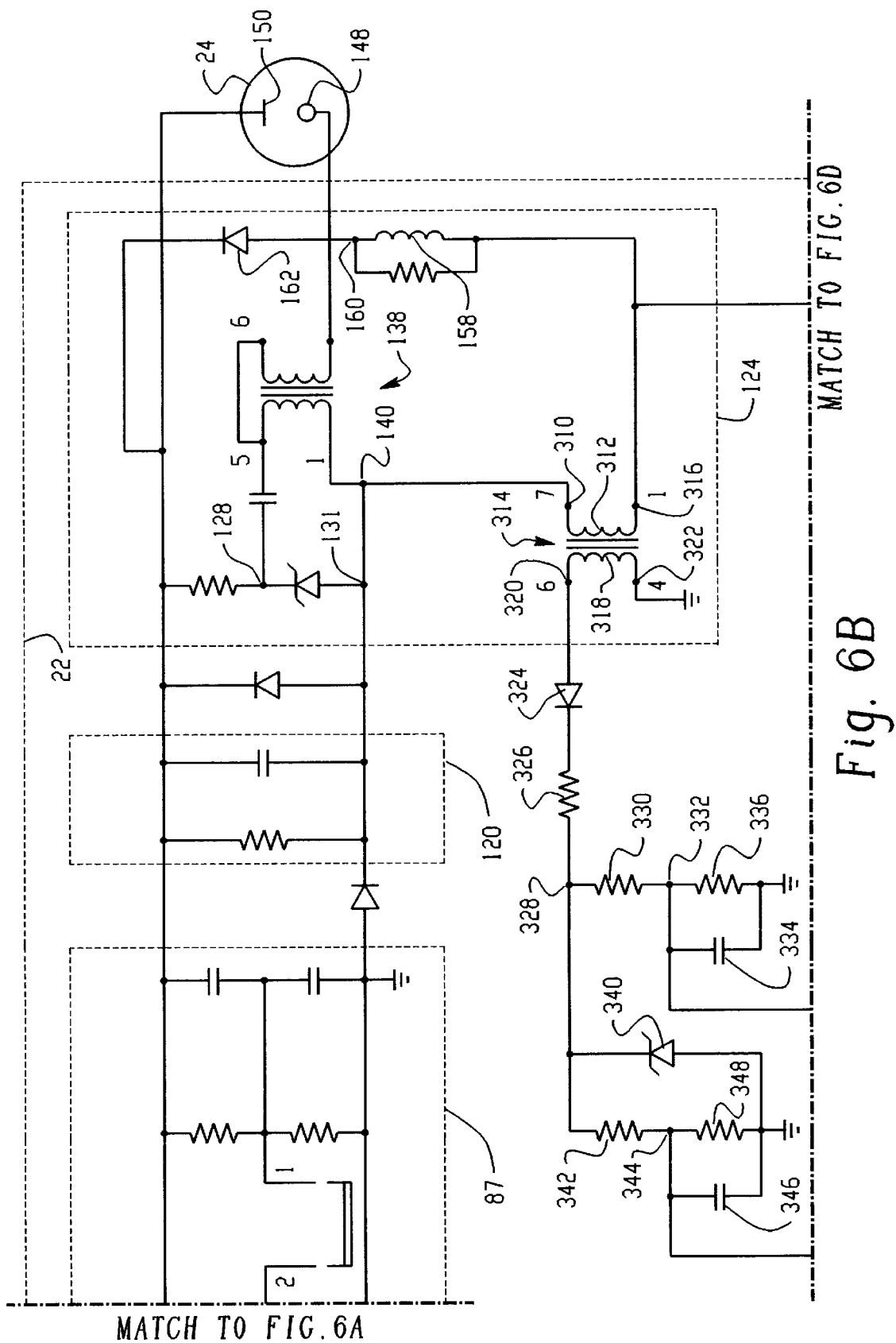
FIG. 6 is a schematic illustration showing another embodiment of an apparatus for controlling a metal-halide lamp according to the system of the present invention.
Figure 6D:
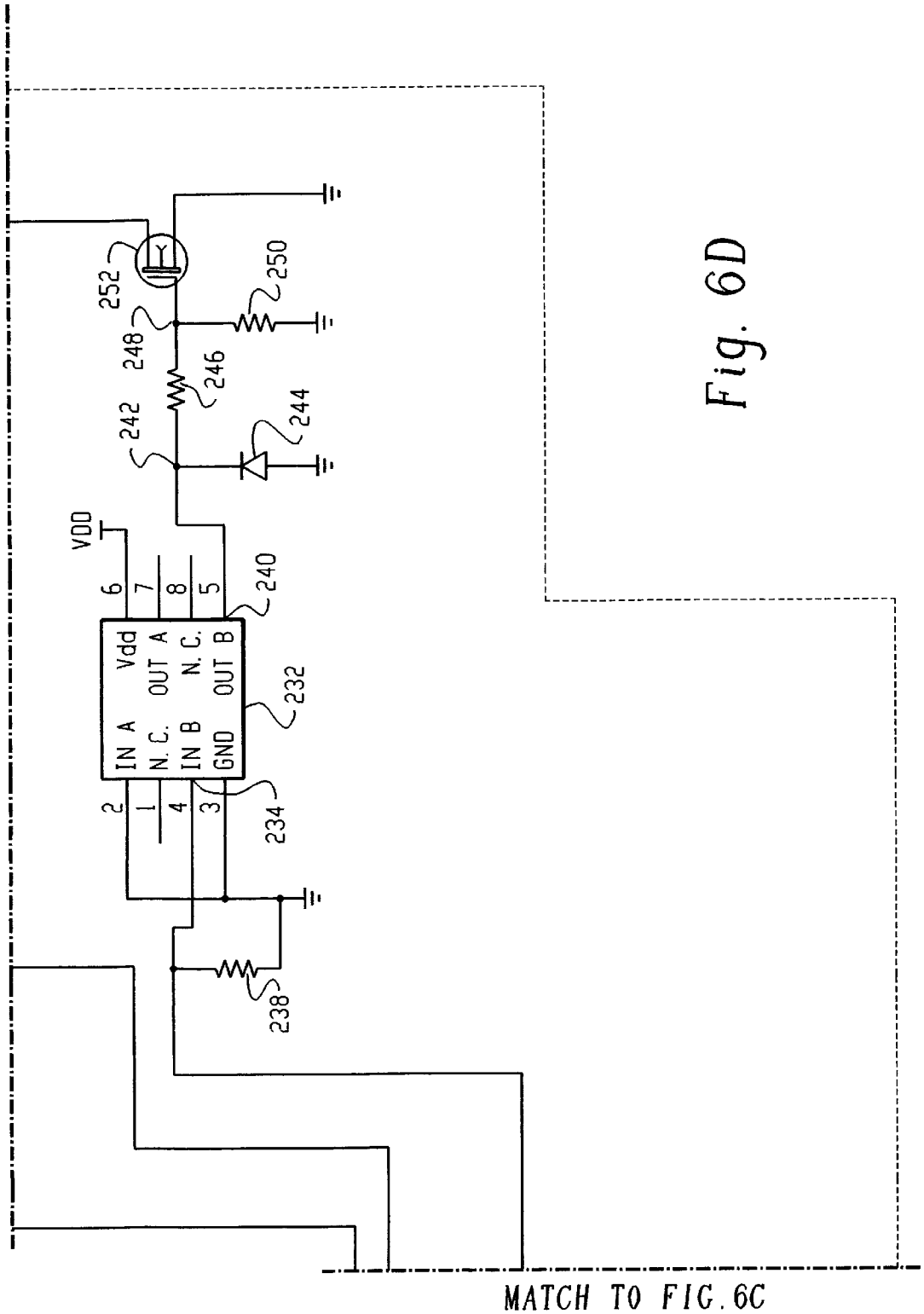

Column 2, line 18, change "FIG. 6 is" to --FIGS. 6A to 6D are--.

Column 2, line 31, change "FIG. 1 shows" to --FIGS. 1A to 1D show--.

Column 21, line 7, change "FIG. 6" to --FIGS. 6A to 6D--.

Signed and Sealed this

Fourth Day of April, 2000

Attest:

Q. TODD DICKINSON

Attesting Officer

Director of Patents and Trademarks